(12) United States Patent
Fukasawa

(10) Patent No.: US 11,461,157 B2
(45) Date of Patent: Oct. 4, 2022

(54) PERIPHERAL DEVICE, METHOD, AND RECORDING MEDIUM

(71) Applicant: NEC Platforms, Ltd., Kawasaki (JP)

(72) Inventor: Masahito Fukasawa, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 120 days.

(21) Appl. No.: 16/463,890

(22) PCT Filed: Dec. 8, 2017

(86) PCT No.: PCT/JP2017/044195
§ 371 (c)(1),
(2) Date: May 24, 2019

(87) PCT Pub. No.: WO2018/110452
PCT Pub. Date: Jun. 21, 2018

(65) Prior Publication Data
US 2019/0324839 A1 Oct. 24, 2019

(30) Foreign Application Priority Data
Dec. 13, 2016 (JP) .............................. JP2016-240864

(51) Int. Cl.
*G06F 11/00* (2006.01)
*G06F 11/07* (2006.01)

(52) U.S. Cl.
CPC ...... *G06F 11/0769* (2013.01); *G06F 11/0706* (2013.01); *G06F 11/0751* (2013.01); *G06F 11/0787* (2013.01)

(58) Field of Classification Search
CPC ............. G06F 11/0769; G06F 11/0706; G06F 11/0751; G06F 11/0787; G06F 11/0733; G06F 11/2221
See application file for complete search history.

(56) References Cited

U.S. PATENT DOCUMENTS

| 5,440,729 A | * | 8/1995 | Kimura ............... G06F 11/0745 710/19 |
| 2011/0083047 A1 | * | 4/2011 | Stenfort .............. G03F 7/70341 714/57 |

(Continued)

FOREIGN PATENT DOCUMENTS

| JP | H06-208485 A | 7/1994 |
| JP | H10-161826 A | 6/1998 |

(Continued)

OTHER PUBLICATIONS

International Search Report for PCT Application No. PCT/JP2017/044195, dated Feb. 20, 2018.

(Continued)

*Primary Examiner* — Philip Guyton
(74) *Attorney, Agent, or Firm* — Sughrue Mion, PLLC

(57) ABSTRACT

A peripheral device according to the present invention includes: a memory; and a processor. The processor performs operations. The operations includes: detecting a failure related to the peripheral device and notifying a host device of occurrence of the failure; transmitting the failure information to the host device when failure information relating to the failure is requested by the host device after notifying of the occurrence of the failure, storing the failure information in the memory when there is no request for the failure information from the host device, and reading the failure information from the memory and transmitting the read failure information to the host device when the stored failure information is requested by the host device; and initializing the peripheral device after storing the failure information in the memory when initialization is instructed by the host device.

5 Claims, 19 Drawing Sheets

(56) References Cited

U.S. PATENT DOCUMENTS

| | | | |
|---|---|---|---|
| 2012/0079328 A1* | 3/2012 | Sawaguchi | ......... G06F 11/0721 714/47.1 |
| 2014/0068352 A1 | 3/2014 | Matsuura et al. | |
| 2016/0139994 A1 | 5/2016 | Matsumoto et al. | |

FOREIGN PATENT DOCUMENTS

| | | | |
|---|---|---|---|
| JP | 2001-147828 | A | 5/2001 |
| JP | 2002-024071 | A | 1/2002 |
| JP | 2002-229816 | A | 8/2002 |
| JP | 2007-207014 | A | 8/2007 |
| JP | 2012-168907 | A | 9/2012 |
| JP | 2014-048782 | A | 3/2014 |
| JP | 2014-146197 | A | 8/2014 |
| JP | 2014-182676 | A | 9/2014 |
| JP | 2016-095692 | A | 5/2016 |

OTHER PUBLICATIONS

English translation of Written opinion for PCT Application No. PCT/JP2017/044195.
Japanese Office Action for JP Application No. 2016-240864 dated Apr. 21, 2020 with English Translation.

* cited by examiner

Fig.4
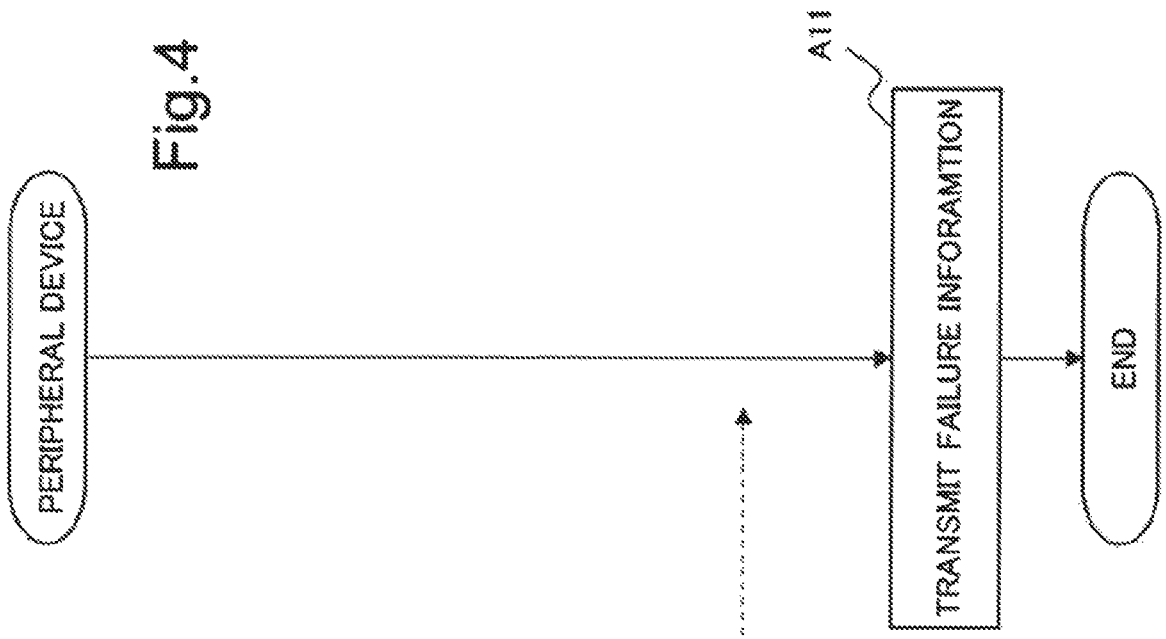
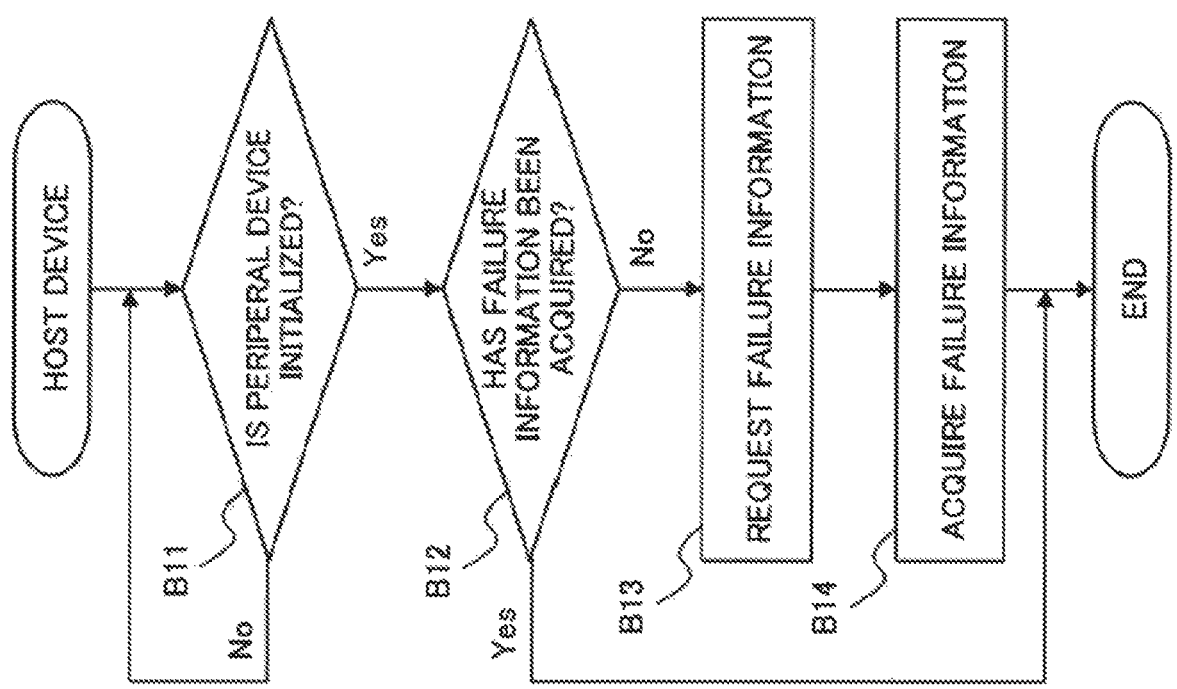

PERIPHERAL DEVICE, METHOD, AND RECORDING MEDIUM

This application is a National Stage Entry of PCT/JP2017/044195 filed on Dec. 8, 2017, which claims priority from Japanese Patent Application 2016-240864 filed on Dec. 13, 2016, the contents of all of which are incorporated herein by reference, in their entirety.

TECHNICAL FIELD

The present invention relates to a technique of processing a failure related to a peripheral device.

BACKGROUND ART

When a failure related to a peripheral device in an information processing system occurs, it is important to acquire information relating to the failure for early recovery.

One example of a technique of acquiring information relating to a failure in an information processing system is described in Patent Literature (PTL) 1. The related technique monitors whether or not a processor operates normally. When a processor does not operate normally, the related technique acquires an operation log from a main storage device storing the operation log of the processor by using direct memory access (DMA) transfer.

Further, another example of a technique of acquiring information relating to a failure related to a peripheral device is described in PTL 2. The related technique disposes a failure notification unit and a non-transitory memory in a peripheral component interconnect (PCI) box connecting a PCI device and a host device. Further, the failure notification unit is also connected to a monitoring device. The failure notification unit acquires, when detecting a failure of the PCI device, information relating to the failure from the PCI device, stores the acquired information on the non-transitory memory, and notifies the monitoring device of an error. The monitoring device reads, depending on the notification of the error, information relating to the failure from the non-transitory memory disposed in the PCI box.

CITATION LIST

Patent Literature

[PTL 1] Japanese Unexamined Patent Application Publication No. 2014-182676
[PTL 2] Japanese Unexamined Patent Application Publication No. 2014-48782

SUMMARY OF INVENTION

Technical Problem

However, the related techniques described above have the following issues.

A failure related to a peripheral device may be automatically recovered by resetting the peripheral device in some cases. When a failure is automatically recovered, a time necessary until recovery is further reduced. However, the peripheral device loses information relating to the failure when being reset.

The related technique described in PTL 1 uses DMA transfer in order to acquire information relating to a failure before a processor is reset. However, when a failure occurs in a path of DMA, the related technique is unable to acquire information relating to a failure. Further, the related technique acquires information relating to a failure before a processor is reset, but it is not described that a failure of a processor is recovered.

Further, the related technique described in PTL 2 stores information relating to a failure in a PCI box even when a PCI device is reset, but a special hardware element referred to as a PCI box is needed. Further, the related technique acquires information relating to a failure of a PCI device, but it is not described that a failure of the PCI device is recovered.

The present invention is made in order to solve the issues described above. In other words, an object of the present invention is to provide a technique of further reducing, when a failure related to a peripheral device occurs, a time necessary to recover from the failure while further ensuring acquisition of information relating to the failure.

Solution to Problem

A peripheral device according to one aspect of the present invention includes:
a memory; and
at least one processor coupled to the memory.
The processor performs operations. The operations includes:
detecting a failure related to the peripheral device, and notifying a host device of occurrence of the failure;
transmitting, when failure information relating to the failure is requested by the host device after notifying of the occurrence of the failure, the failure information to the host device, storing the failure information in the memory when there is no request for the failure information from the host device, and reading the failure information from the memory and transmitting the read failure information to the host device when the stored failure information is requested by the host device; and
initializing, when initialization is instructed by the host device, the peripheral device depending on the instruction and initializing, when the failure information is stored in the memory, the peripheral device after storing the failure information in the memory.

A host device according to one aspect of the present invention includes:
a memory; and
at least one processor coupled to the memory.
The processor performs operations. The operations includes:
requesting, when the occurrence of the failure is notified from the above-mentioned peripheral device, the failure information to the peripheral device, and instructing the initialization to the peripheral device after acquiring the failure information; and
requesting, when detecting the initialization of the peripheral device, the failure information to the peripheral device when having not acquired the failure information yet, and acquiring the failure information.

A maintenance device according to one aspect of the present invention includes:
a memory; and
at least one processor coupled to the memory.
The processor performs operations. The operations includes:
reading and acquiring, when being connected to the memory of the above-mentioned peripheral device, the failure information from the memory.

An information processing system according to one aspect of the present invention includes:

the above-mentioned peripheral device according; and the above-mentioned host device.

A method according to one aspect of the present invention includes:

detecting, by a peripheral device, a failure related to the peripheral device, and notifying a host device of occurrence of the failure;

requesting, by the host device, failure information relating to the failure to the peripheral device depending on notification of the occurrence of the failure;

transmitting, by the peripheral device, the failure information to the host device depending on the request;

instructing, by the host device, initialization to the peripheral device after acquiring the failure information;

initializing, by the peripheral device, the peripheral device depending on the instruction for the initialization;

storing, by the peripheral device, the failure information in a memory when there is no request for the failure information from the host device after notifying of the occurrence of the failure to the host device, and initializing the peripheral device after storing the failure information in the memory;

requesting, by the host device, when detecting initialization of the peripheral device, the failure information to the peripheral device when having not acquired the failure information yet; and reading, by the peripheral device, the failure information from the memory depending on the request, and transmitting the failure information to the host device.

A method according to another aspect of the present invention includes: by a peripheral device, detecting a failure related to the peripheral device, and notifying a host device of occurrence of the failure;

transmitting, when failure information relating to the failure is requested by the host device after notifying of the occurrence of the failure, the failure information to the host device;

initializing, when initialization is instructed by the host device, the peripheral device depending on the instruction;

storing, when there is no request for the failure information from the host device after notifying of the occurrence of the failure, the failure information in a memory and initializing the peripheral device after storing the failure information in the memory; and reading, when the stored failure information is requested by the host device, the failure information from the memory, and transmitting the failure information to the host device.

A non-transitory computer-readable recording medium according to one aspect of the present invention embodies a program. The program causes a peripheral device to perform a method. The method includes:

detecting a failure related to the peripheral device, and notifying a host device of occurrence of the failure;

transmitting, when failure information relating to the failure is requested by the host device after notifying of the occurrence of the failure, the failure information to the host device;

initializing, when initialization is instructed by the host device, the peripheral device depending on the instruction;

storing, when there is no request for the failure information from the host device after notifying of the occurrence of the failure, the failure information in a memory, and initializing the peripheral device after storing the failure information in the memory; and reading, when the stored failure information is requested by the host device, the failure information from the memory and transmitting the failure information to the host device.

Advantageous Effects of Invention

The present invention can provide a technique of further reducing, when a failure related to a peripheral device occurs, a time necessary to recover from the failure while further ensuring acquisition of information relating to the failure.

BRIEF DESCRIPTION OF DRAWINGS

FIG. 4 is a flowchart illustrating an operation of the information processing system, at the time when a peripheral device is initialized, in the first example embodiment of the present invention.

EXAMPLE EMBODIMENT

Hereinafter, example embodiments of the present invention are described in detail with reference to the drawings.

First Example Embodiment

Figure 1:
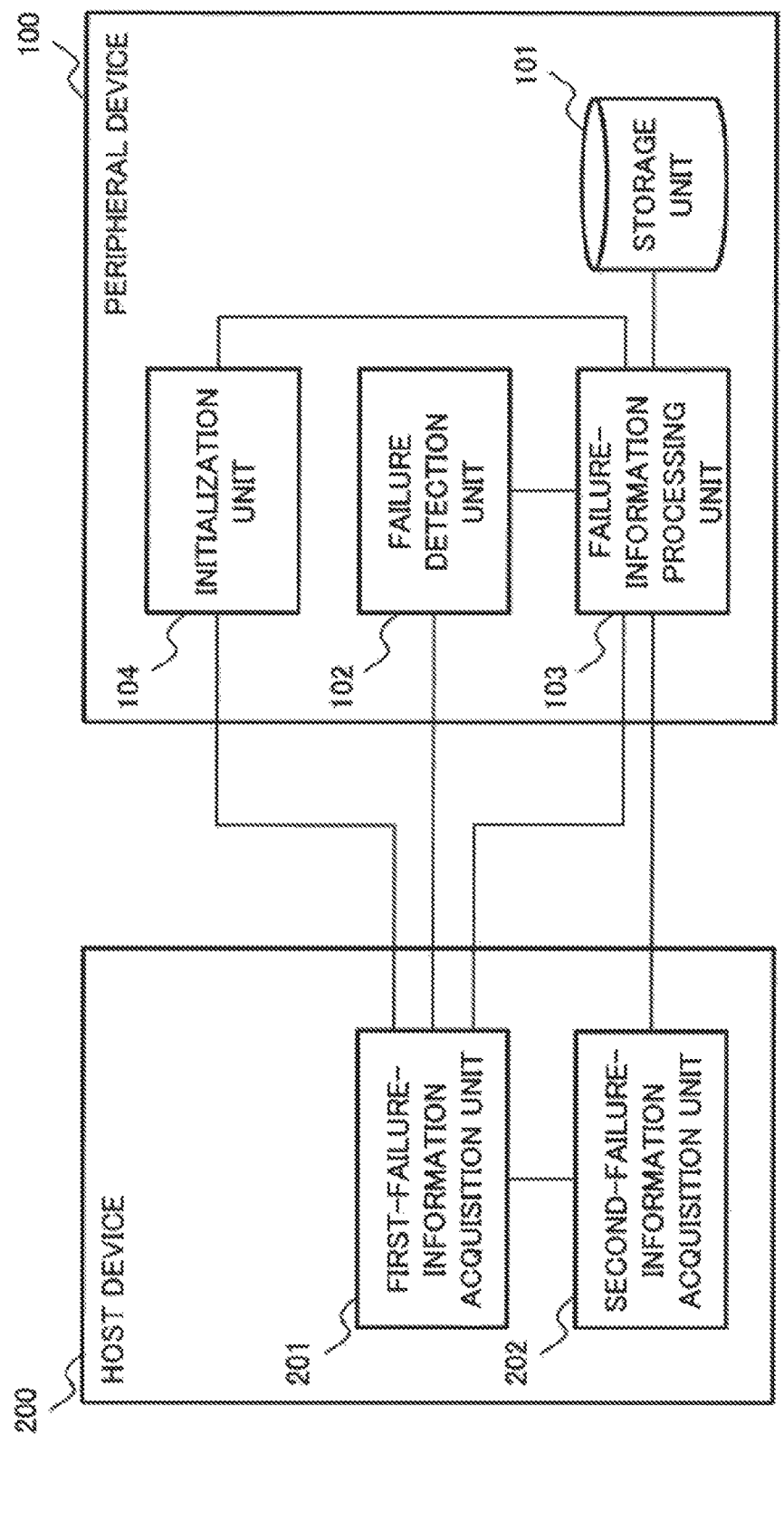
FIG. 1 is a block diagram illustrating a configuration of an information processing system as a first example embodiment of the present invention.

A function block configuration of an information processing system 1 as a first example embodiment of the present invention is illustrated in FIG. 1. In FIG. 1, the information processing system 1 includes a peripheral device 100 and a host device 200. The peripheral device 100 includes a storage unit 101, a failure detection unit 102, a failure-information processing unit 103, and an initialization unit 104. Further, the host device 200 includes a first-failure-information acquisition unit 201 and a second-failure-information acquisition unit 202. Further, the peripheral device 100 and the host device 200 are communicably connected to each other.

Figure 2:
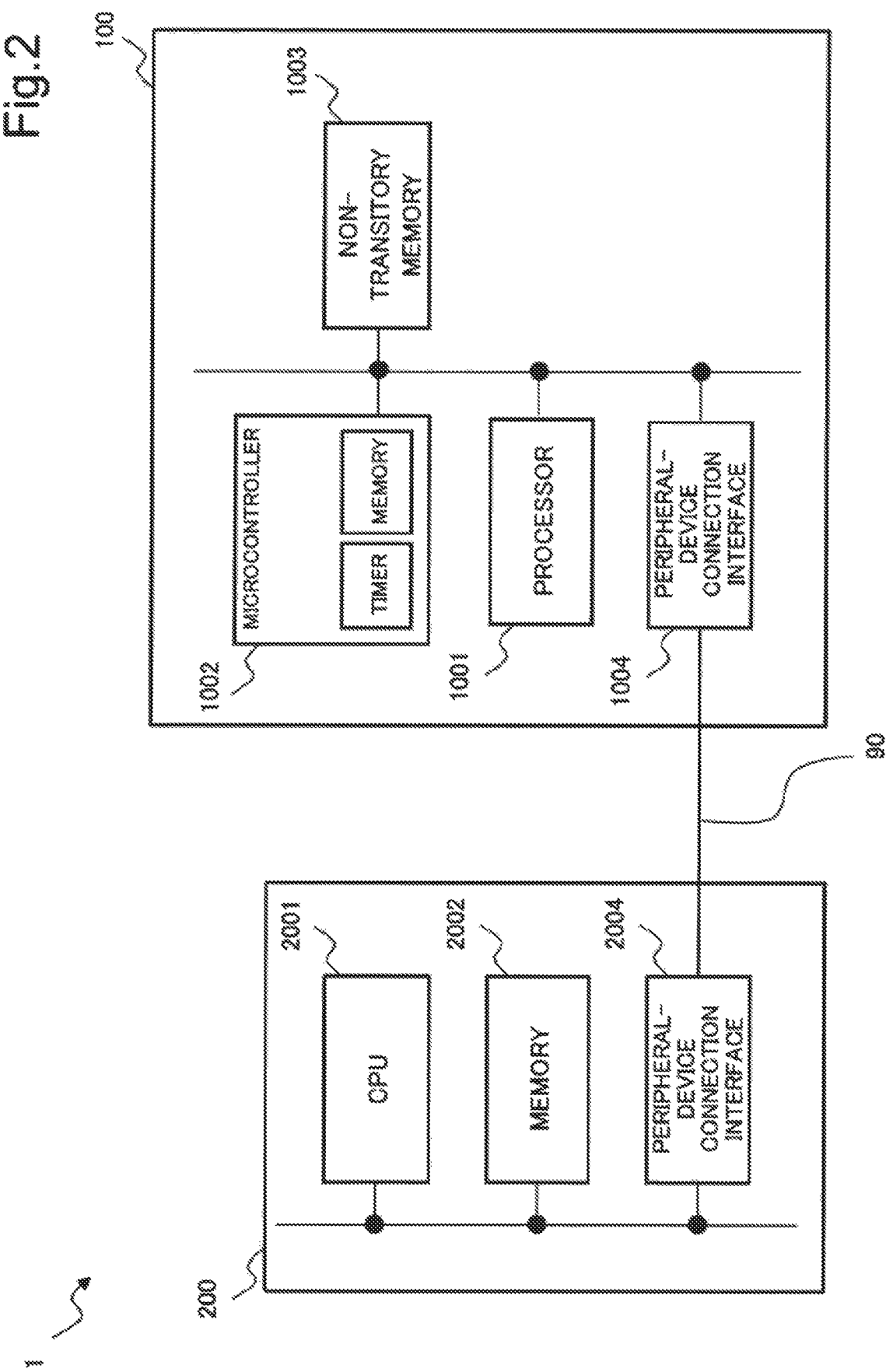
FIG. 2 is a diagram illustrating one example of a hardware configuration of the information processing system as the first example embodiment of the present invention.

Here, the information processing system 1 can be configured by hardware elements as illustrated in FIG. 2. In FIG. 2, the peripheral device 100 includes a processor 1001, a microcontroller 1002 including a timer and a memory, a non-transitory memory 1003, and a peripheral-device connection interface 1004. The processor 1001 mainly executes processing during operation of the peripheral device 100. The processor 1001 may be, for example, a general purpose graphic processing unit (GPGPU). The microcontroller 1002 mainly executes processing during failure occurrence in the peripheral device 100. The peripheral-device connection interface 1004 is an interface for connection to the host device 200 via a bus 90. The bus 90 may be, for example, a peripheral component interconnect (PCI) bus. In such a hardware configuration, the storage unit 101 of the peripheral device 100 is configured by the non-transitory memory 1003. Further, each of other function blocks of the peripheral device 100 is configured by the processor 1001 and the microcontroller 1002.

Further, in FIG. 2, the host device 200 includes a central processing unit (CPU) 2001, a memory 2002, and a peripheral-device connection interface 2004. The memory 2002 is configured by a random access memory (RAM), a read only memory (ROM), an auxiliary storage device (a hard disk or the like), or the like. The peripheral-device connection interface 2004 is an interface for connection to the peripheral device 100 via the bus 90. As described above, the peripheral-device connection interface 2004 may be, for example, an interface for connection to a PCI bus. In such a hardware configuration, each function block of the host device 200 is configured by the CPU 2001 that reads and execute a computer program stored in the memory 2002.

Note that a hardware configuration of each device and each function block of the device which configure the information processing system 1 is not limited to the configuration described above.

Next, details of function blocks of the peripheral device 100 are described.

The storage unit 101 stores information. In detail, the storage unit 101 stores failure information, based on control of the failure-information processing unit 103 to be described later.

The failure detection unit 102 detects a failure related to the peripheral device, and notifies the host device 200 of occurrence of the failure. The notification is executed, for example, by transmitting an interrupt signal via the bus 90.

The failure-information processing unit 103 transmits, when failure information is requested by the host device 200 after notifying of the occurrence of the failure, the failure information to the host device 200. Herein, it is assumed that the failure information is information relating to a failure able to be collected when the failure occurs in the peripheral device 100.

Further, the failure-information processing unit 103 stores failure information in the storage unit 101 when there is no request for the failure information from the host device 200 after notifying of the occurrence of the failure. For example, when a failure is occurring in the bus 90, a notification of the occurrence of the failure from the peripheral device 100 to the host device 200 is not reached, and there is no request for the failure information from the host device 200.

For example, the failure-information processing unit 103 may count a predetermined time by starting a timer after notifying of occurrence of a failure. In this case, when receiving a request from the host device 200 before counting of the timer expires, the failure-information processing unit 103 may execute processing of transmitting the failure information to the host device 200. Further, in this case, when not receiving a request from the host device 200 before counting of the timer expires, the failure-information processing unit 103 may execute processing of storing the failure information in the storage unit 101.

Further, when failure information stored in the storage unit 101 is requested by the host device 200, the failure-information processing unit 103 reads the failure information from the storage unit 101 and transmits the failure information to the host device 200.

The initialization unit 104 initializes, when initialization is instructed by the host device 200 after transmitting failure information to the host device 200, the peripheral device depending on the instruction. Further, when failure information is stored in the storage unit 101, the initialization unit 104 initializes the peripheral device after storing the failure information.

Next, details of function blocks of the host device 200 are described.

The first-failure-information acquisition unit 201 requests failure information to the peripheral device 100 when occurrence of a failure is notified from the peripheral device 100. Further, the first-failure-information acquisition unit 201 instructs initialization to the peripheral device 100 after acquiring the failure information. An instruction for initialization is performed, for example, by transmission of a reset signal via the bus 90.

When the peripheral device 100 succeeds at initialization and failure information is not acquired yet, the second-failure-information acquisition unit 202 requests the failure information to the peripheral device 100 and acquires the failure information. Specifically, when detecting that the peripheral device 100 is initialized, the second-failure-information acquisition unit 202 determines whether or not failure information has already been acquired. Then, when determining that the failure information has not been acquired yet, the second-failure-information acquisition unit 202 may request the failure information to the peripheral device 100.

An operation of the information processing system 1 configured as described above is described with reference to the drawings.

Figure 3:
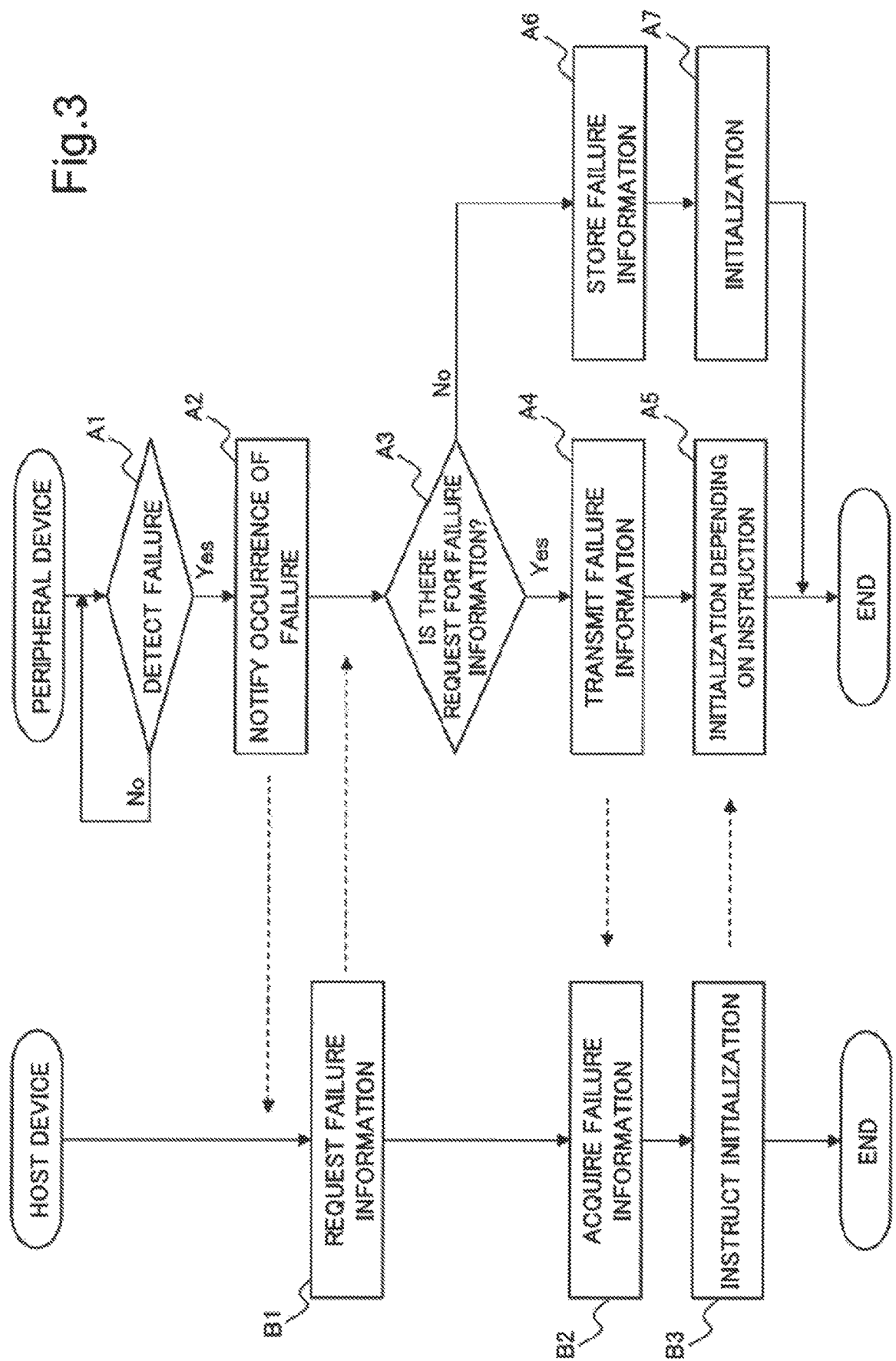
FIG. 3 is a flowchart illustrating an operation of the information processing system, at the time when a failure occurs in a peripheral device, in the first example embodiment of the present invention.

First, an operation of the information processing system 1, at the time when a failure related to the peripheral device 100 occurs, is illustrated in FIG. 3. Note that, in FIG. 3, the left figure illustrates an operation of the host device 200, and the right figure illustrates an operation of the peripheral device 100.

First, when detecting a failure related to the peripheral device (Yes in step A1), the failure detection unit 102 of the peripheral device 100 notifies the host device 200 of occurrence of the failure (step A2).

Next, when receiving the notification of the occurrence of the failure, the first-failure-information acquisition unit 201 of the host device 200 requests the failure information to the peripheral device 100 (step B1).

Next, when receiving the request for the failure information (Yes in step A3), the failure-information processing unit 103 of the peripheral device 100 transmits the failure information to the host device 200 (step A4).

Then, when acquiring the failure information (step B2), the first-failure-information acquisition unit 201 of the host device 200 instructs initialization to the peripheral device 100 (step B3).

Next, the initialization unit 104 of the peripheral device 100 initializes the peripheral device depending on the instruction for initialization (step A5).

Further, a case in which there is no request for failure information from the host device 200 after notifying of the occurrence of the failure from the peripheral device 100 to the host device 200 (No in step A3) is described. This results from a cause that, for example, as described above, due to occurrence of a failure in the bus 90 or the like, the notification of the occurrence of the failure in step A2 is not reached to the host device 200.

In this case, the failure-information processing unit 103 of the peripheral device 100 stores failure information relating to the occurred failure in the storage unit 101 (step A6).

Then, the initialization unit 104 initializes the peripheral device (step A7).

As described above, the information processing system 1 terminates an operation at the time when a failure related to the peripheral device 100 occurs.

Next, an operation of the information processing system 1, at the time when the peripheral device 100 is initialized, is illustrated in FIG. 4. Note that, in FIG. 4, the left figure illustrates an operation of the host device 200, and the right figure illustrates an operation of the peripheral device 100.

First, when detecting that the peripheral device 100 is initialized (Yes in step B11), the second-failure-information acquisition unit 202 of the host device 200 determines whether or not failure information has already been acquired (step B12).

When the failure information has already been acquired (Yes in step B12), the information processing system 1 terminates the operation.

On the other hand, when failure information has not been acquired yet (No in step B12), the second-failure-information acquisition unit 202 requests failure information to the peripheral device 100 (step B13).

Next, when receiving the request for failure information, the failure-information processing unit 103 of the peripheral device 100 reads the failure information from the storage unit 101 and transmits the failure information to the host device 200 (step A11).

Next, the second-failure-information acquisition unit 202 of the host device 200 acquires the failure information (step B14).

As described above, the information processing system 1 terminates an operation at the time when the peripheral device 100 is initialized.

Next, in the information processing system 1, a processing sequence, at the time when a failure related to the peripheral device 100 is occurred during operation, is described with reference to the drawings.

Figure 5:
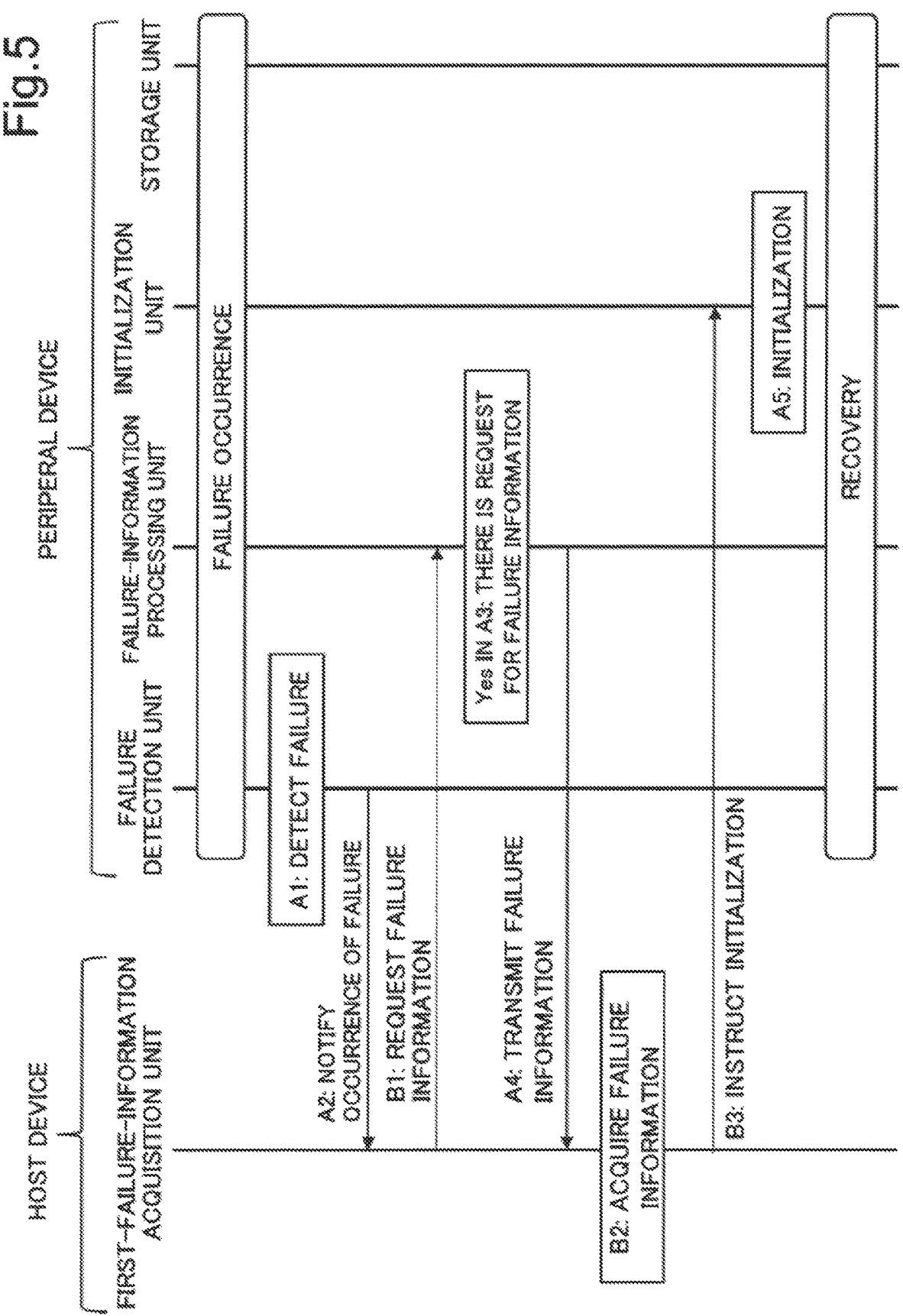
FIG. 5 is a sequence diagram illustrating a flow of processing of the information processing system, when a failure occurs in a peripheral device but there is no failure in a connection bus to a host device, in the first example embodiment of the present invention.

First, a processing sequence, when the bus 90 is normal at the time when a failure related to the peripheral device 100 occurs, is illustrated in FIG. 5.

First, when a failure related to the peripheral device 100 occurs, the failure detection unit 102 of the peripheral device 100 detects the failure (step A1).

Next, the failure detection unit 102 notifies the host device 200 of the occurrence of the failure (step A2).

Next, when receiving the notification of the occurrence of the failure, the first-failure-information acquisition unit 201 of the host device 200 requests the failure information to the peripheral device 100 via the bus 90 (step B1).

Next, when receiving the request for the failure information (Yes in step A3), the failure-information processing unit 103 of the peripheral device 100 transmits the failure information to the host device 200 (step A4).

Next, after acquiring the failure information (step B2), the first-failure-information acquisition unit 201 of the host device 200 instructs initialization to the peripheral device 100 via the bus 90 (step B3).

Then, the initialization unit 104 of the peripheral device 100 executes initialization depending on the instruction (step A5).

Thereby, the host device 200 can acquire failure information and make the peripheral device 100 automatically recover.

Figure 6:
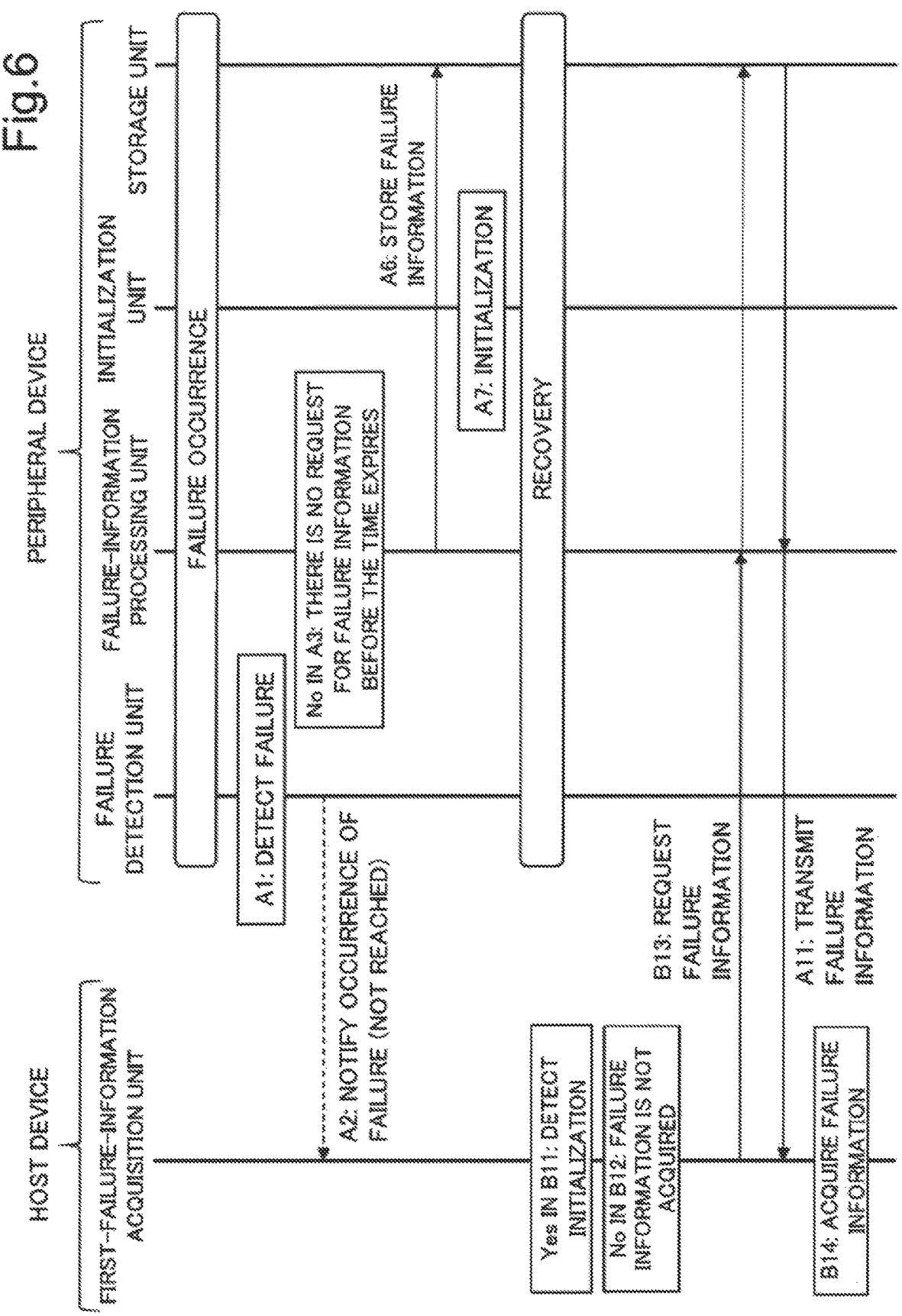
FIG. 6 is a sequence diagram illustrating a flow of processing of the information processing system, when a failure occurs at least in a connection bus to a host device in a peripheral device, in the first example embodiment of the present invention.

Next, a processing sequence, at the time when the bus 90 is not normal when a failure related to the peripheral device 100 occurs, is illustrated in FIG. 6.

First, when a failure related to the peripheral device 100 occurs, the failure detection unit 102 of the peripheral device 100 detects the failure (step A1).

Next, the failure detection unit 102 notifies the host device 200 of the occurrence of the failure (step A2). However, since the bus 90 is not normal, the notification is not reached.

Next, after notifying of the occurrence of the failure, the failure-information processing unit 103 starts a timer in such a way as to count a predetermined time. Then, the failure-information processing unit 103 determines that there is no request for failure information from the host device 200 before the timer expires (No in step A3).

Next, the failure-information processing unit 103 stores the failure information in the storage unit 101 (step A6).

Next, the initialization unit 104 initializes the peripheral device (step A7).

Next, the second-failure-information acquisition unit 202 of the host device 200 determines that the peripheral device 100 is initialized (Yes in step B11) and failure information has not been acquired yet (No in step B12).

Then, the second-failure-information acquisition unit 202 requests the failure information to the peripheral device 100 via the bus 90 (step B13).

Next, when receiving the request for failure information, the failure-information processing unit 103 of the peripheral device 100 reads the failure information from the storage unit 101 and transmits the failure information to the host device 200 (step A11).

Next, the second-failure-information acquisition unit 202 of the host device 200 acquires the failure information (step B14).

Thereby, the peripheral device 100 can automatically recover and provide the failure information to the host device 200.

Next, an advantageous effect of the first example embodiment of the present invention is described.

The information processing system as the first example embodiment of the present invention can further reduce, when a failure related to a peripheral device occurs, a time necessary to recover from the failure while further ensuring acquisition of information relating to the failure.

The reason is described as follows. In the present example embodiment, the peripheral device includes the storage unit, the failure detection unit, the failure-information processing unit, and the initialization unit. Further, the host device includes the first-failure-information acquisition unit and the second-failure-information acquisition unit. The failure detection unit of the peripheral device detects a failure related to the peripheral device, and notifies the host device of occurrence of the failure. Depending on the notification, the first-failure-information acquisition unit of the host device requests failure information to the peripheral device. Depending on the request, the failure-information processing unit of the peripheral device transmits the failure information to the host device. Then, the first-failure-information acquisition unit of the host device instructs, after acquiring the failure information, initialization to the peripheral device. Depending on the instruction, the initialization unit of the peripheral device initializes the peripheral device. Further, when there is no request for the failure information from the host device after notifying of the occurrence of the failure to the host device, the failure-information processing unit of the peripheral device stores the failure information in the storage unit and initializes the peripheral device after storing the failure information. Then, when not acquiring the failure information yet after the peripheral device succeeds at initialization, the second-failure-information acquisition unit of the host device requests the failure information to the peripheral device. Then, depending on the request, the failure-information processing unit of the peripheral device reads the failure information from the storage unit and transmits the failure information to the host device.

In this manner, when failure related to a peripheral device occurs during operation of an information processing system, the present example embodiment reliably acquires failure information while automatically recovering the peripheral device, regardless of whether or not communication to the peripheral device is possible.

Further, the present example embodiment is configured by a host device and a peripheral device. Therefore, the present example embodiment does not need a special hardware element between the host device and the peripheral device as in the related technique described in PTL2 and achieves an advantageous effect of enhancing maintainability of the peripheral device.

Second Example Embodiment

Next, a second example embodiment of the present invention is described in detail with reference to corresponding drawings. Note that, in each of drawings referred to in description of the present example embodiment, the same reference signs are assigned to the similar components as in the first example embodiment and steps operating similarly to the first example embodiment of the present invention, and detailed description in the present example embodiment is omitted.

Figure 7:
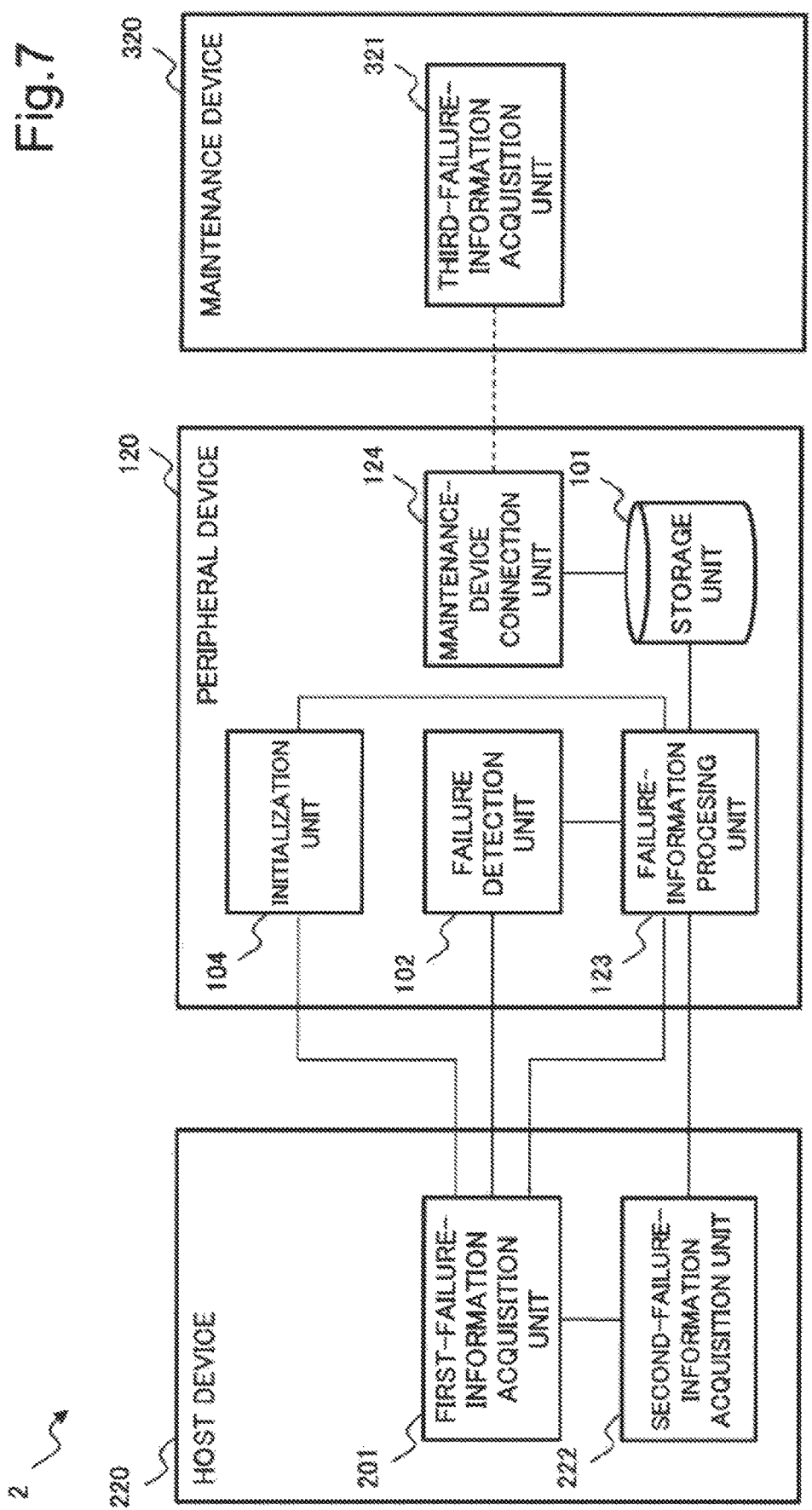
FIG. 7 is a block diagram illustrating a configuration of an information processing system as a second example embodiment of the present invention.

First, a configuration of an information processing system 2 according to the second example embodiment of the present invention is illustrated in FIG. 7. In FIG. 7, the information processing system 2 includes a peripheral device 120, a host device 220, and a maintenance device 320. The peripheral device 120 and the host device 220 are communicably connected to each other during operation. The peripheral device 120 and the maintenance device 320 may not necessarily be connected to each other during operation and are connected to each other, as necessary, in association with occurrence of a failure related to the peripheral device 120.

The peripheral device 120 is different from the peripheral device 100 in the first example embodiment of the present invention in a point that a failure-information processing unit 123 is included instead of the failure-information processing unit 103 and further, a maintenance-device connection unit 124 is included. The host device 220 is different from the host device 200 in the first example embodiment of the present invention in a point that a second-failure-information acquisition unit 222 is included instead of the second-failure-information acquisition unit 202. The maintenance device 320 includes a third-failure-information acquisition unit 321.

Figure 8:
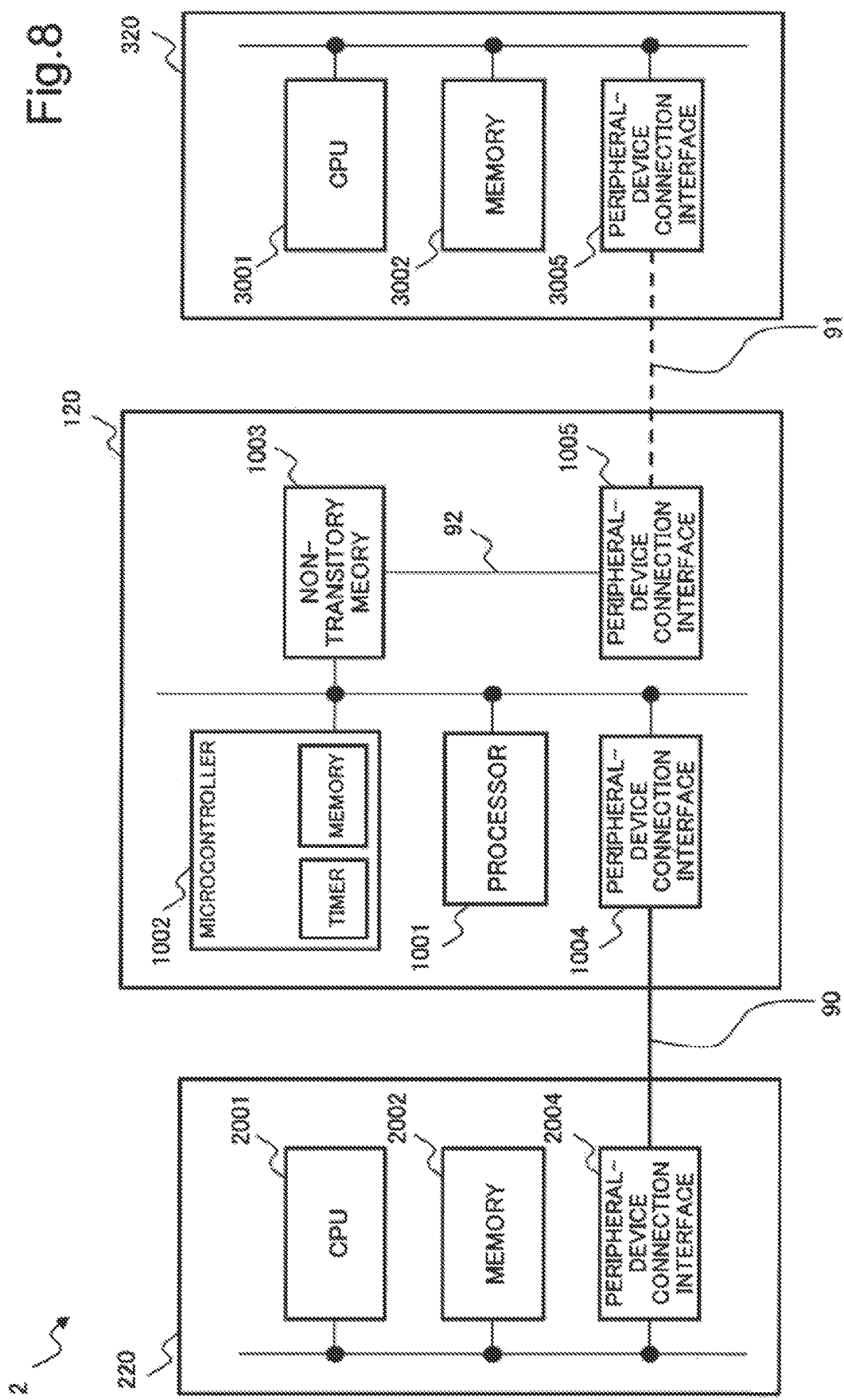
FIG. 8 is a diagram illustrating one example of a hardware configuration of the information processing system as the second example embodiment of the present invention.

Herein, the information processing system 2 may be configured by hardware elements as illustrated in FIG. 8. In FIG. 8, the peripheral device 120 is configured by including, in addition to the similar hardware elements as that in the peripheral device 100 described with reference to FIG. 2, a peripheral-device connection interface 1005. The peripheral-device connection interface 1005 is an interface for connection to the maintenance device 320 via a bus 91. Further, the peripheral-device connection interface 1005 is connected to the storage unit 101 via a bus 92. In such a hardware configuration, the maintenance-device connection unit 124 is configured by the bus 92 and the peripheral-device connection interface 1005. Note that the peripheral-device connection interface 1005 may be a connection interface having a standard different from that of the peripheral-device connection interface 1004.

Further, in FIG. 8, the host device 220 is configure by the similar hardware elements as that of the host device 200 described with reference to FIG. 2.

Further, in FIG. 8, the maintenance device 320 includes a CPU 3001, a memory 3002, and a peripheral-device connection interface 3005. The memory 3002 is configured by a RAM, a ROM, an auxiliary storage device, or the like. The peripheral-device connection interface 3005 is an interface for connection to the peripheral-device connection interface 1005 of the peripheral device 120 via the bus 91. In such the hardware configuration, function blocks of the maintenance device 320 are configured by the CPU 3001 that reads a computer program stored in the memory 3002 and executes the computer program.

Note that a hardware configuration of each device and each function block of the device configuring the information processing system 2 is not limited to the configuration described above.

Next, among the function blocks of the peripheral device 120, function blocks different from the first example embodiment of the present invention are described.

The failure-information processing unit 123 is configured as follows, in addition to a configuration similar to the configuration of the failure-information processing unit 103 according to the first example embodiment of the present invention. In other words, the failure-information processing unit 123 stores a flag indicating that failure information is not acquired together at the time when storing the failure information in the storage unit 101 when there is no request for the failure information from the host device 220 after notifying of occurrence of a failure. The flag is information representing whether or not failure information is not acquired by the host device 220 or the maintenance device 320. Hereinafter, when it is indicated that failure information is not acquired, it is also described that a flag is on. Further, it is also described as setting a flag to be on to store a flag indicating that failure information is not acquired. Further, when it is indicated that failure information has already been acquired, it is also described that a flag is off. Further, it is also described as setting a flag to be off to store a flag indicating that failure information has already been acquired.

Further, the failure-information processing unit 123 transmits a flag stored in the storage unit 101 depending on a request of the host device 220. Further, the failure-information processing unit 123 sets a flag stored in the storage unit 101 to be off depending on an instruction of the host device 220.

Further, the failure-information processing unit 123 reads, when failure information stored in the storage unit 101 is requested form the host device 220, the failure information from the storage unit 101 and transmits the failure information to the host device 220.

The maintenance-device connection unit 124 connects the storage unit 101 to the maintenance device 320.

Next, among function blocks of the host device 220, function blocks different from the second example embodiment of the present invention is described.

The second-failure-information acquisition unit 222 is configured as follows, in addition to a configuration similar to the configuration of the second-failure-information acquisition unit 202 in the first example embodiment of the present invention. In other words, the second-failure-information acquisition unit 222 determines, when detecting that the peripheral device 120 is initialized, whether or not failure information is not acquired based on a flag of the storage unit 101 of the peripheral device 120. The second-failure-information acquisition unit 222 requests failure information to the peripheral device 120 when a flag is on. Further, the second-failure-information acquisition unit 222 instructs the peripheral device 120 to set a flag of the storage unit 101 to be off after acquiring the failure information.

Next, function blocks of the maintenance device 320 are described.

The third-failure-information acquisition unit 321 acquires, when connected to the storage unit 101 of the peripheral device 120 via the maintenance-device connection unit 124, failure information from the storage unit 101.

When the peripheral device 120 fails in initialization, the maintenance device 320 is typically connected to the storage unit 101 of the peripheral device 120 via the maintenance-device connection unit 124. The third-failure-information acquisition unit 321 reads, when detecting the connection to the peripheral device 120, a flag from the storage unit 101 via the maintenance-device connection unit 124 and determines whether or not failure information is not acquired based on the read flag. When the flag is on, the third-failure-information acquisition unit 321 reads and acquires failure information from the storage unit 101 of the peripheral device 120. Further, the third-failure-information acquisition unit 321 accesses, after acquiring the failure information, the storage unit 101 via the maintenance-device connection unit 124 and sets a flag to be off.

An operation of the information processing system 2 configured as described above is described with reference to the drawings.

Figure 9:
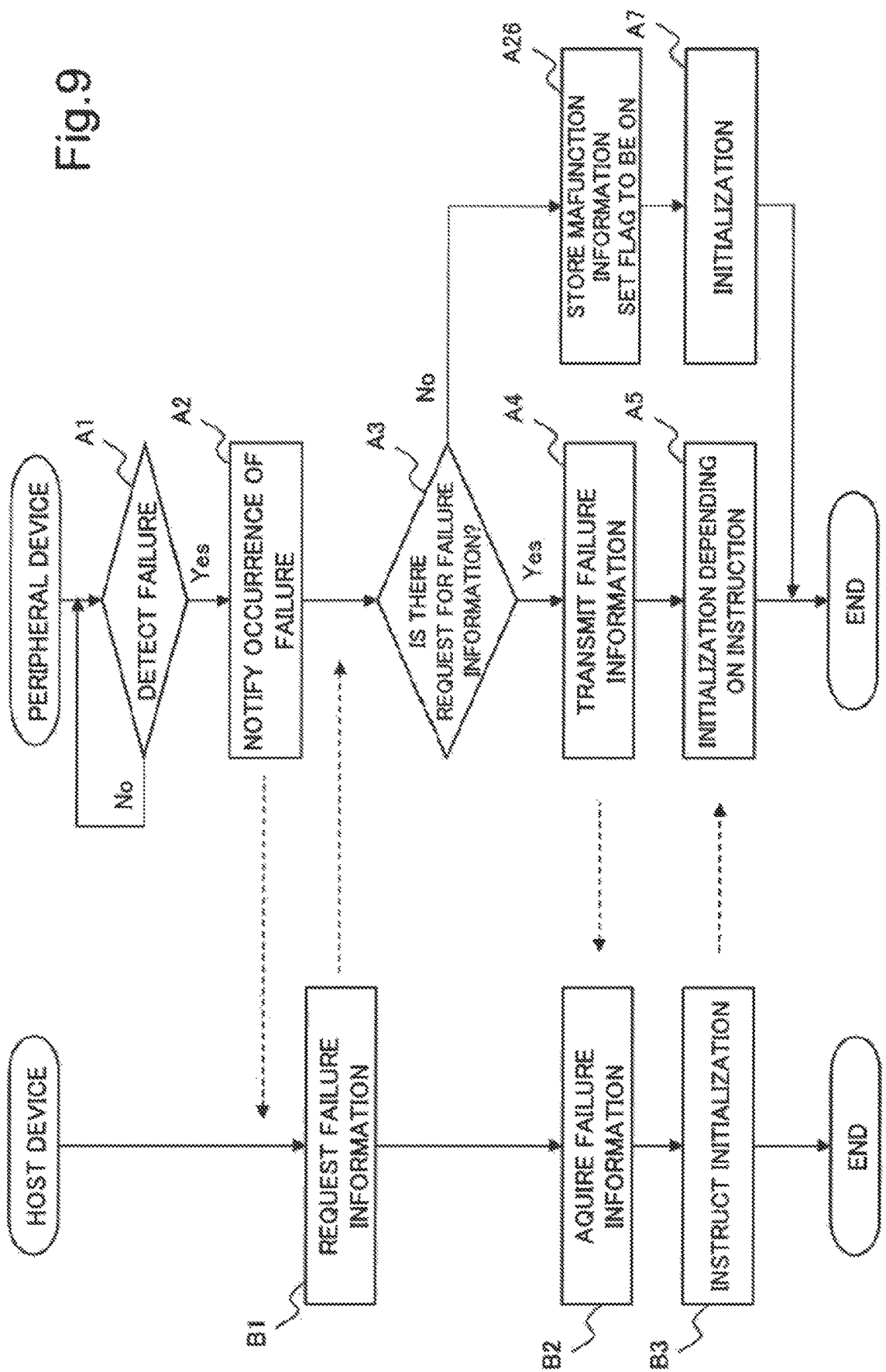
FIG. 9 is a flowchart illustrating an operation of the information processing system, at the time when a failure occurs in a peripheral device, in the second example embodiment of the present invention.

First, an operation of the information processing system 2, at the time when a failure related to the peripheral device 120 occurs, is illustrated in FIG. 9. In FIG. 9, an operation of the information processing system 2 is substantially similar to the operation of the information processing system 1 described with reference to FIG. 3. However, a point that the peripheral device 120 executes step A26 instead of step A6 when there is no request for failure information from the host device 220 after notifying the host device 220 of occurrence of a failure is different.

In other words, in this case, the failure-information processing unit 123 sets a flag to be on, in addition to store failure information in the storage unit 101 (step A26).

Thereafter, the initialization unit 104 initializes the peripheral device, similarly to the first example embodiment of the present invention (step A7).

As described above, description of an operation of the information processing system 2, at the time when a failure related to the peripheral device 120 occurs, is finished.

Figure 10:
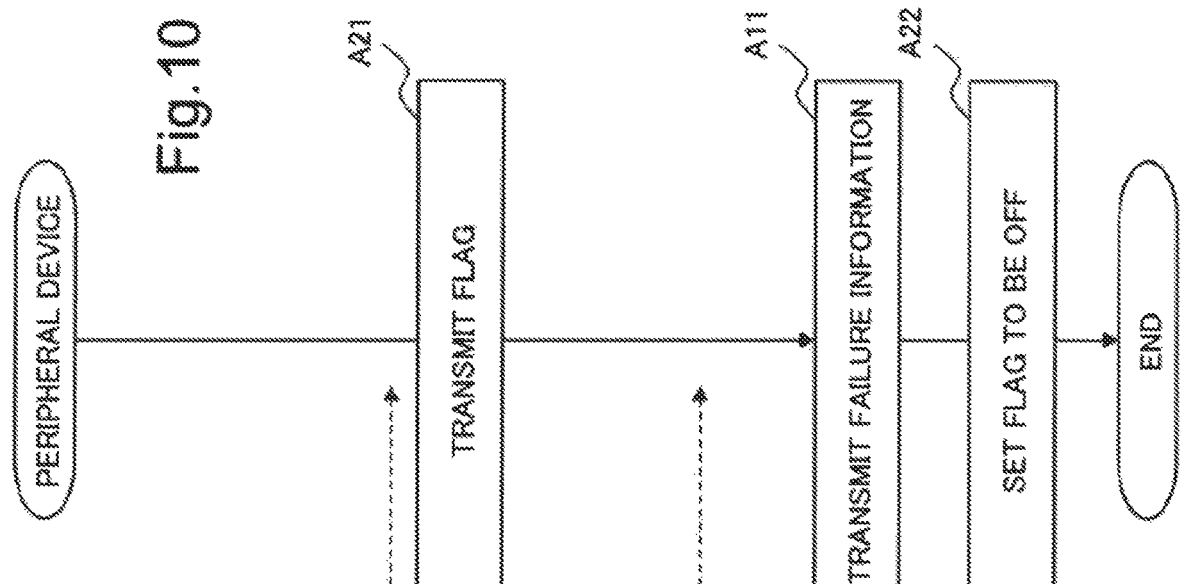
FIG. 10 is a flowchart illustrating an operation of the information processing system, when a peripheral device succeeds at initialization, in the second example embodiment of the present invention.

Next, an operation of the information processing system 2, after the peripheral device 120 succeeds at initialization, is illustrated in FIG. 10. It is assumed that initialization of the peripheral device 120 succeeds and normal communication with the host device 220 is possible.

First, when detecting that the peripheral device 120 is initialized (Yes in step B11), the second-failure-information acquisition unit 222 of the host device 220 requests a flag to the peripheral device 120 (step B21).

Next, depending on the request, the failure-information processing unit 123 of the peripheral device 120 reads a flag from the storage unit 101 and transmits the flag to the host device 220 (step A21).

Next, the second-failure-information acquisition unit 222 of the host device 220 determines whether or not the flag is on (step B22).

When the flag is not on (No in step B22), the information processing system 2 terminates the operation.

On the other hand, a case where the flag is on (Yes in step B22) is described. In this case, the host device 220 and the peripheral device 120 execute steps B13, A11, and B14, similarly to the first example embodiment of the present invention. Thereby, the host device 220 acquires failure information from the peripheral device 120.

Next, the second-failure-information acquisition unit 222 of the host device 220 instructs the peripheral device 120 to set a flag to be off (step B25).

Next, the failure-information processing unit 123 of the peripheral device 120 sets a flag stored in the storage unit 101 to be off (step A22).

As described above, the information processing system 2 terminates an operation after the peripheral device 120 succeeds at initialization.

Figure 11:
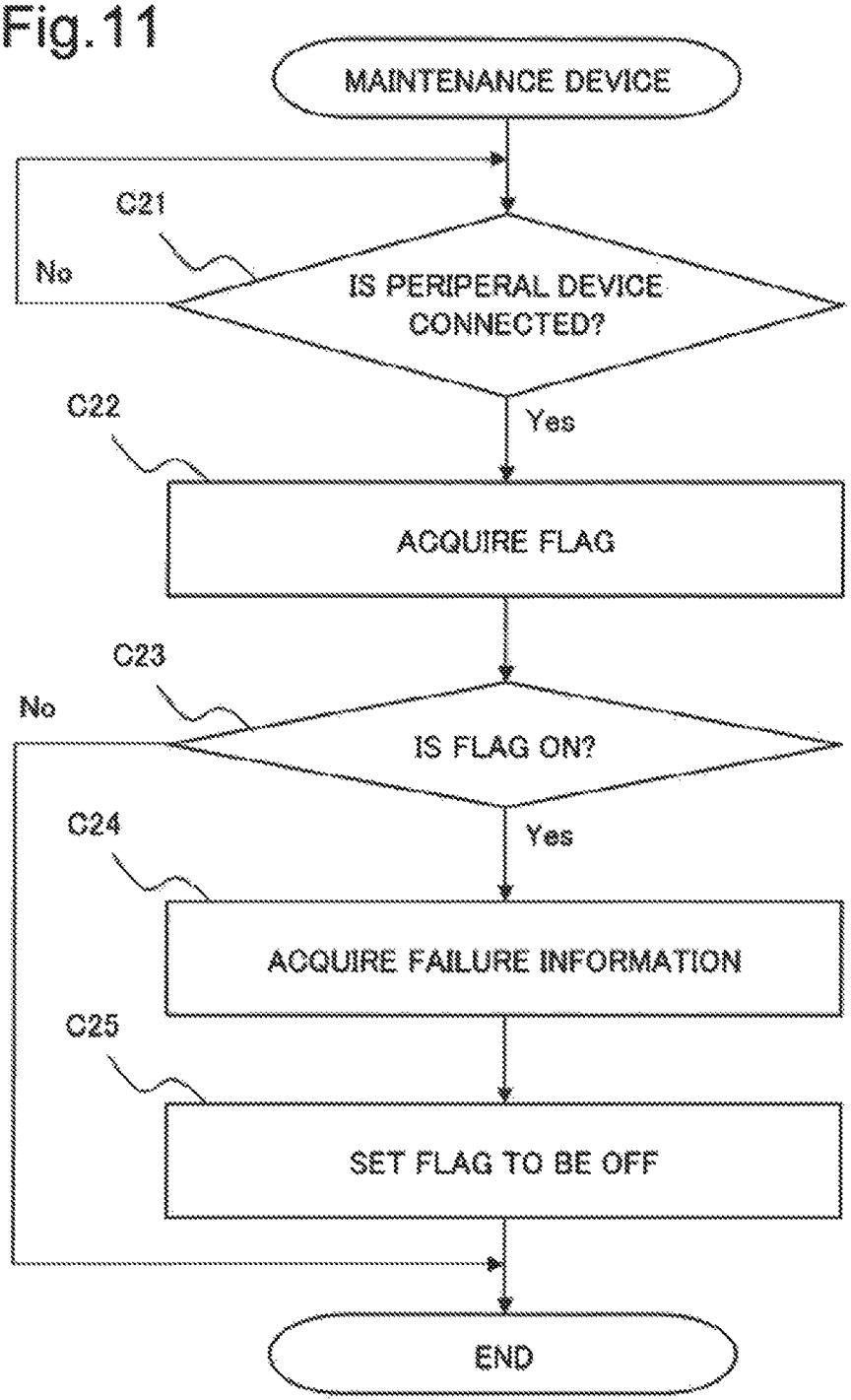
FIG. 11 is a flowchart illustrating an operation of the information processing system, when a peripheral device has failed, in initialization in the second example embodiment of the present invention.

Next, an operation of the information processing system 2, after the peripheral device 120 fails in initialization, is illustrated in FIG. 11. Herein it is assumed that the peripheral device 120 is connected to the maintenance device 320. Note that, typically, when the initialization of the peripheral device 120 is failed and the communicated with the host device 220 is not normally executed, the peripheral device 120 is connected to the maintenance device 320. In such a case, for example, the peripheral device 120 is detached from the host device 220 and is connected to the maintenance device 320.

In FIG. 11, first, when detecting that the peripheral device 120 is connected (Yes in step C21), the third-failure-information acquisition unit 321 of the maintenance device 320 acquires a flag from the storage unit 101 via the maintenance-device connection unit 124 (step C22).

Next, the third-failure-information acquisition unit 321 determines whether or not the acquired flag is on (step C23).

Herein, when the flag is not on (No in step C23), the information processing system 2 terminates the operation.

On the other hand, a case where a flag is on (Yes in step C23) is described. In this case, the third-failure-information acquisition unit 321 acquires failure information from the storage unit 101 via the maintenance-device connection unit 124 (step C24).

Next, the third-failure-information acquisition unit 321 accesses the storage unit 101 via the maintenance-device connection unit 124 and sets a flag to be off (step C25).

As described above, the information processing system 2 terminates the operation executed after the peripheral device 120 fails in initialization.

Next, a processing sequence, at the time when a failure related to the peripheral device 120 occurs during operation in the information processing system 2, is described with reference to the drawings.

Note that, because a processing sequence, when the bus 90 is normal at the time when a failure related to the peripheral device 120 occurs, is similar to the processing sequence of the information processing system 1 in the first example embodiment of the present invention described with reference to FIG. 5, the description thereof is omitted.

Figure 12:
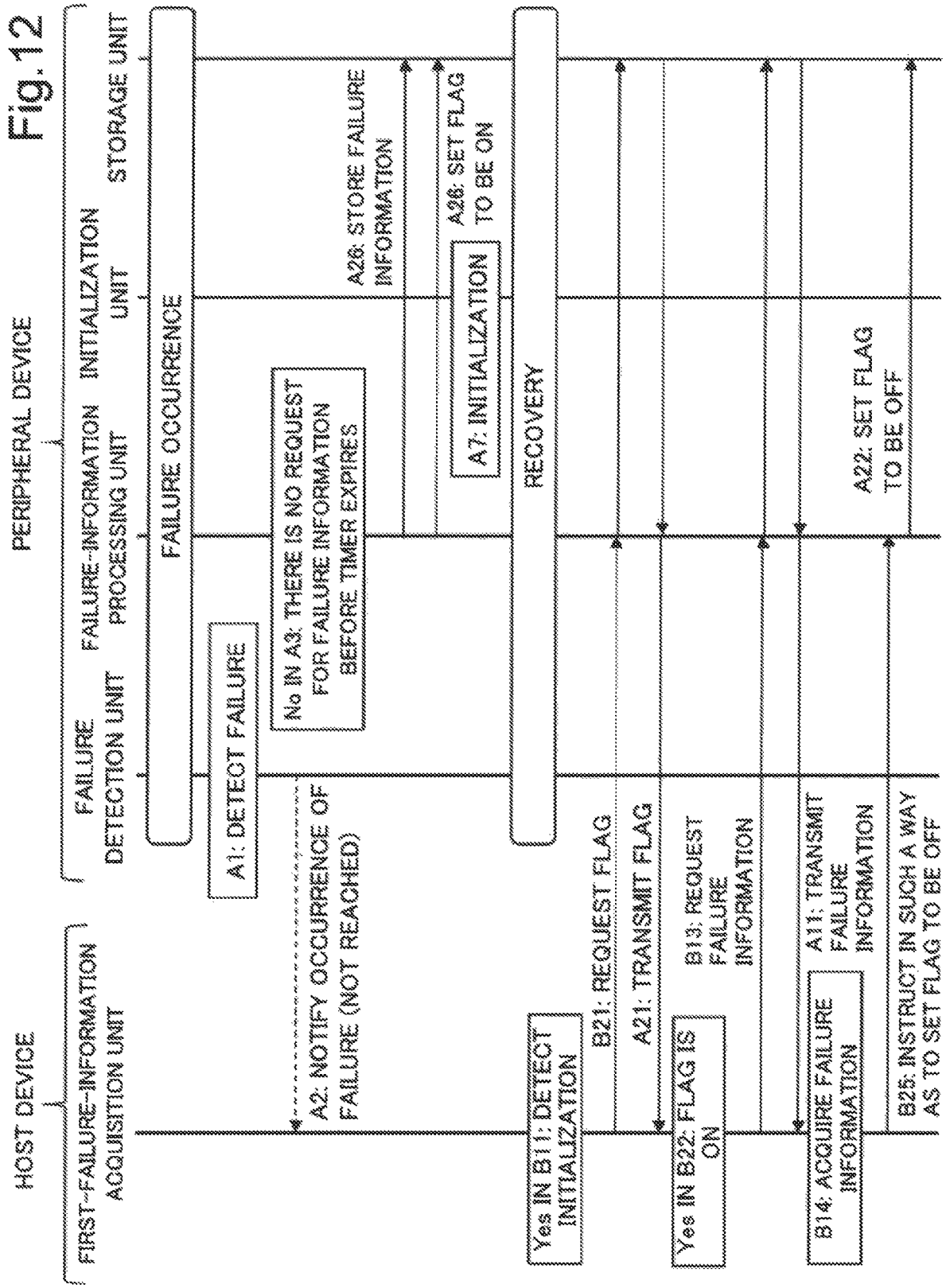
FIG. 12 is a sequence diagram illustrating a flow of processing of the information processing system, when a failure occurs at least in a connection bus to a host device and initialization succeeds in a peripheral device, in the second example embodiment of the present invention.

First, a processing sequence, when automatic recovery of the peripheral device 120 succeeds after a failure related to the bus 90 that connects at least the peripheral device 120 to the host device 220 occurs, is illustrated in FIG. 12.

In FIG. 12, in the processing sequence of the information processing system 2, steps A1 to A3 are similar to those in the information processing system 1 as the first example embodiment of the present invention described with reference to FIG. 6. Thereby, the peripheral device 120 starts a timer after notifying the host device 220 of occurrence of a failure and determines that there is no request for failure information from the host device 220 to the peripheral device 120 before the timer expires.

Then, the failure-information processing unit 123 of the peripheral device 120 stores failure information in the storage unit 101 and sets a flag to be on (step A26)

Next, the initialization unit 104 initializes the peripheral device (step A7).

Next, when the peripheral device 120 is initialized (Yes in step B11), the second-failure-information acquisition unit 222 of the host device 220 requests a flag of the peripheral device 120 (step B21). The flag indicating on is transmitted from the peripheral device 120 (step A21, Yes in step B22).

Hereinafter, in a processing sequence of the information processing system 2, steps B13, A11, and B14 are similar to those in the information processing system 1 as the first example embodiment of the present invention described with reference to FIG. 6. Thereby, the host device 220 acquires failure information.

Then, the second-failure-information acquisition unit 222 instructs the peripheral device 120 to set a flag to be off (step B25).

Next, the failure-information processing unit 123 of the peripheral device 120 sets a flag to be off (step A22).

Thereby, the peripheral device 120 can automatically recover and provide failure information to the host device 220.

Figure 13:
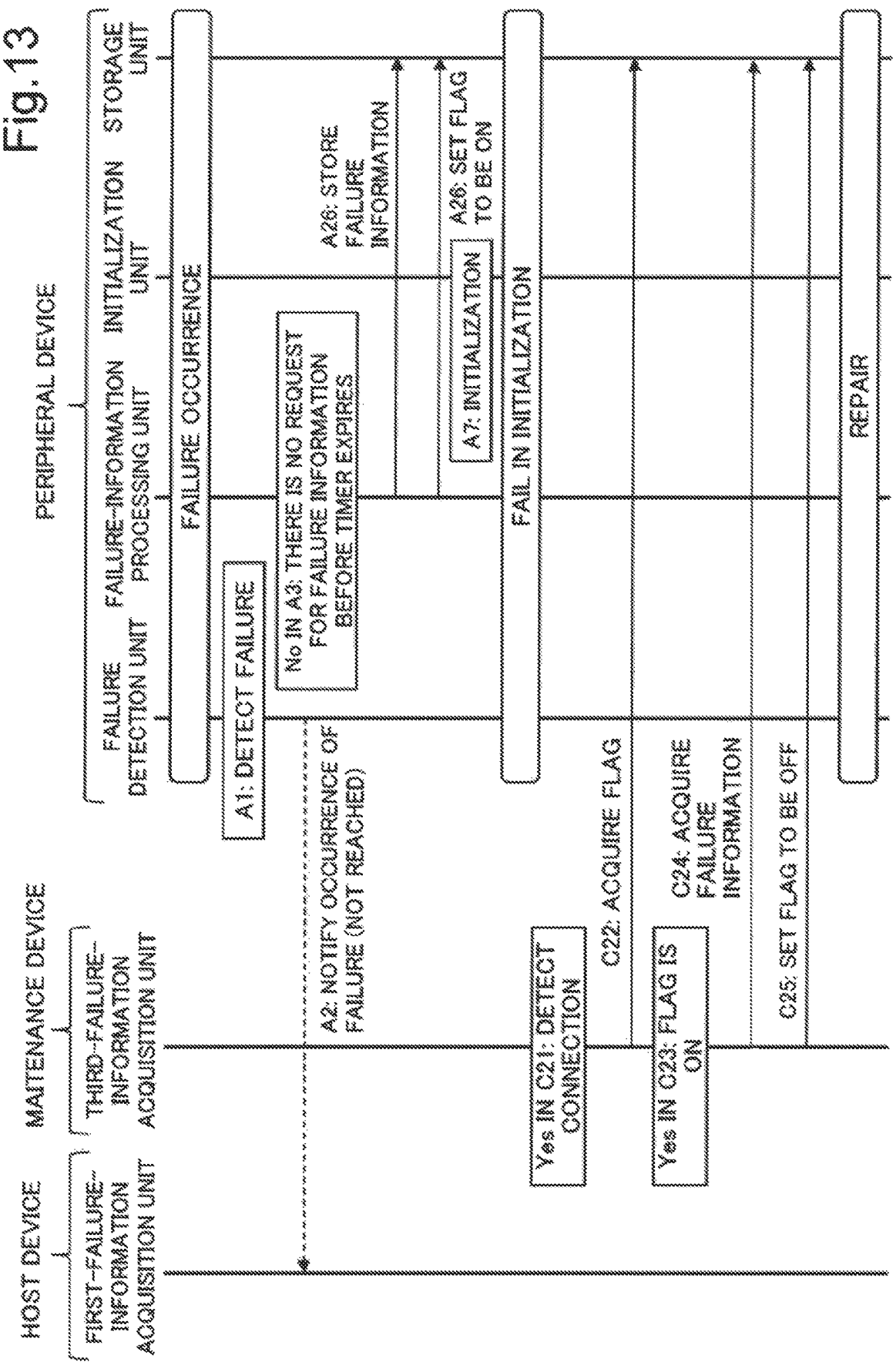
FIG. 13 is a sequence diagram illustrating a flow of processing of the information processing system, when a failure occurs at least in a connection bus to a host device and initialization fails in a peripheral device, in the second example embodiment of the present invention.

Next, a processing sequence, when a failure related to the bus 90 that connects at least the peripheral device 120 to the host device 220 occurs and automatic recovery of the peripheral device 120 fails in the information processing system 2, is illustrated in FIG. 13.

In FIG. 13, in a processing sequence of the information processing system 2, steps A1 to A3, A26, and A7 are similar to those in the processing sequence in which automatic recovery succeeds described with reference to FIG. 12. Thereby, the peripheral device 120 attempts initialization after storing the failure information and the flag (on) in the storage unit 101.

Herein, it is assumed that initialization has failed. Then, it is assumed that the peripheral device 120 is connected to the maintenance device 320.

When the peripheral device 120 is connected (Yes in step C21), the third-failure-information acquisition unit 321 of the maintenance device 320 acquires a flag from the storage unit 101 via the maintenance-device connection unit 124 (step C22). At that time, the acquired flag is on (Yes in step C23).

Then, the third-failure-information acquisition unit 321 acquires failure information from the storage unit 101 via the maintenance-device connection unit 124 (step C24).

Then, the third-failure-information acquisition unit 321 accesses the storage unit 101 via the maintenance-device connection unit 124 and sets a flag to be off (step C25).

Thereafter, typically, the peripheral device 120 is expected to be repaired.

Thereby, the peripheral device 120 is able to provide failure information to the maintenance device 320 even when the bus 90 is not normal and automatic recovery fails.

Next, an advantageous effect of the second example embodiment of the present invention is described.

The information processing system as the second example embodiment of the present invention is able to more reliably acquire, when a failure related to the peripheral device occurs, information relating to the failure, both upon success in automatic recovery for reducing a time necessary to recover from a failure and upon failing therein.

The reason is described as follows. In the present example embodiment, the peripheral device includes the maintenance-device connection unit that connects the storage unit to the maintenance device, in addition to a configuration similar to that in the first example embodiment of the present invention. When the maintenance device is connected to the storage unit of the peripheral device that fails in initialization via the maintenance-device connection unit, the third-failure-information acquisition unit acquires failure information from the storage unit.

Further, a further reason is described. In the present example embodiment, the failure-information processing unit of the peripheral device stores, when storing failure information in the storage unit, a flag indicating that failure information is not acquired together. Then, the second-failure-information acquisition unit of the host device or the third-failure-information acquisition unit of the maintenance device executes processing of acquiring failure information from the peripheral device when determining that failure information is not acquired based on the flag.

In this manner, the present example embodiment reliably acquires failure information by using the host device or the maintenance device when a failure related to a peripheral device occurs during operation of the information processing system, regardless of whether automatic recovery of the peripheral device succeeds or fails.

Third Example Embodiment

Figure 14:
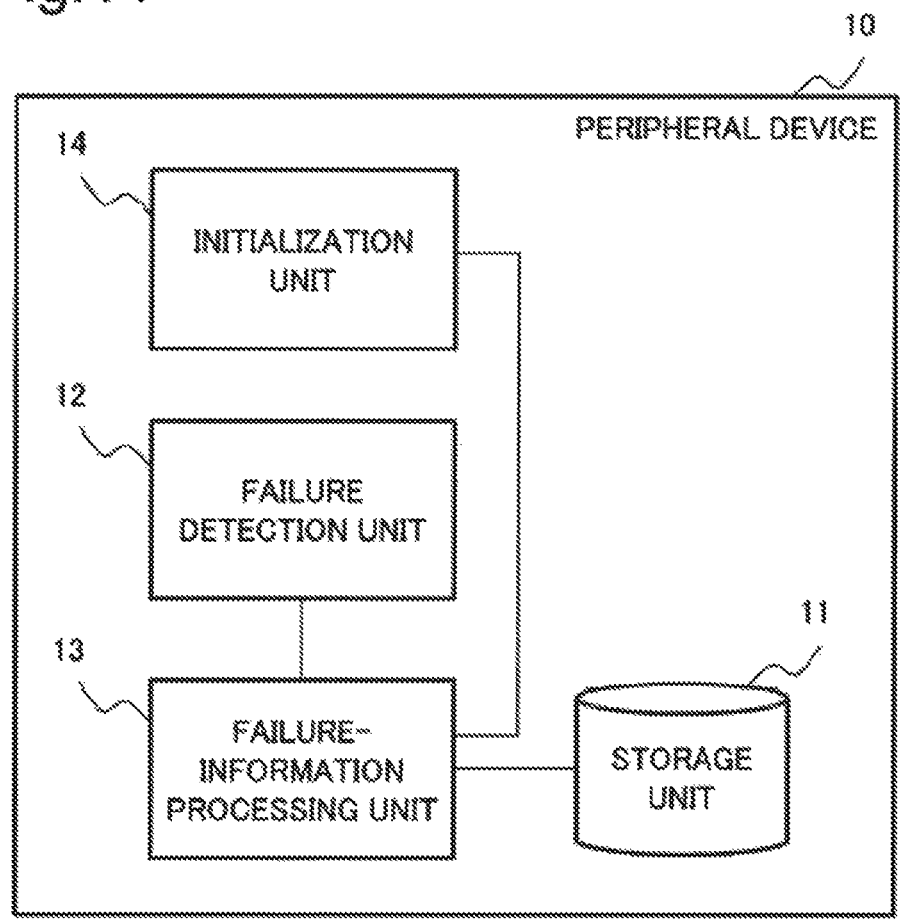
FIG. 14 is a block diagram illustrating a configuration of a peripheral device as a third example embodiment of the present invention.

Next, a peripheral device 10 having a minimum configuration in example embodiments of the present invention is described with reference to the drawings. First, a function block configuration of the peripheral device 10 are illustrated in FIG. 14. In FIG. 14, the peripheral device 10 includes a storage unit 11, a failure detection unit 12, a failure-information processing unit 13, and an initialization unit 14. The peripheral device 10 is connected to a host device.

The storage unit 11 stores information.

The failure detection unit 12 detects a failure related to the peripheral device, and notifies a host device of occurrence of the failure.

The failure-information processing unit 13 transmits, when failure information is requested by the host device after notifying of the occurrence of the failure, the failure information to the host device.

Further, the failure-information processing unit 13 stores the failure information in the storage unit 101 when there is no request for the failure information from the host device after notifying of the occurrence of the failure.

Further, the failure-information processing device 13 reads, when the failure information stored in the storage unit 11 is requested by the host device, the failure information from the storage unit 11 and transmits the failure information to the host device.

The initialization unit 14 initializes, when initialization is instructed by the host device after transmitting the failure information to the host device, the peripheral device depending on the instruction. Further, when the failure information is stored in the storage unit 11, the initialization unit 14 initializes the peripheral device after storing the failure information.

An operation of the peripheral device 10 configured as described above is described with reference to the drawings.

Figure 15:
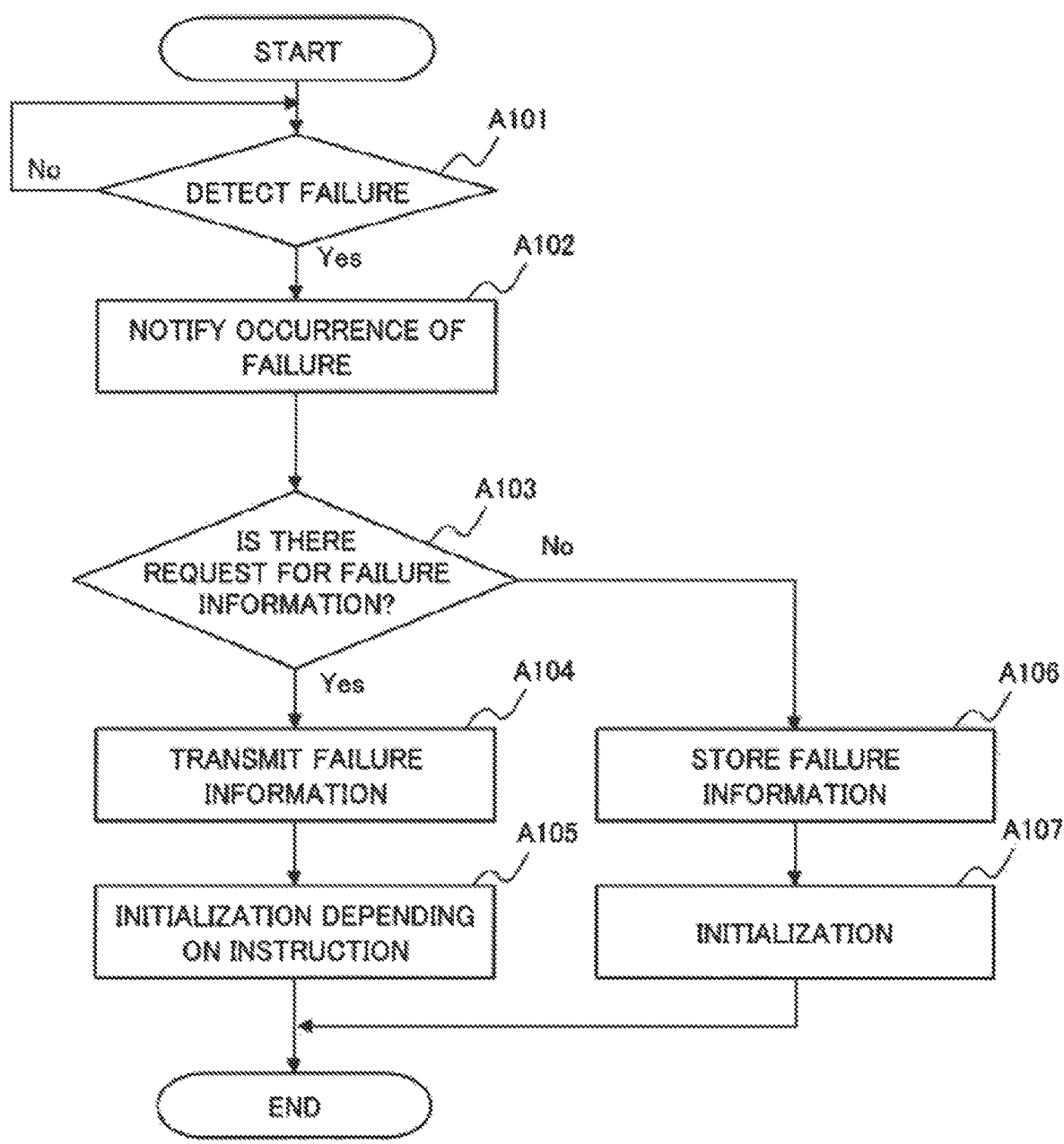
FIG. 15 is a flowchart illustrating an operation of a peripheral device, at the time when a failure occurs in the peripheral device, in the third example embodiment of the present invention.

First, an operation of the peripheral device 10, at the time when a failure related to the peripheral device occurs, is illustrated in FIG. 15.

First, the failure detection unit 12 notifies, when detecting a failure related to the peripheral device (Yes in step A101), the host device of occurrence of the failure (step A102).

Next, the failure-information processing unit 13 determines whether or not a request for failure information is received from the host device (step A103).

Herein, when receiving the request for failure information (Yes in step A103), the failure-information processing unit 13 transmits the failure information to the host device (step A104).

Then, the initialization unit 14 initializes the peripheral device depending on an instruction from the host device (step A105).

On the other hand, when not receiving the request for failure information (No in step A103), the failure-information processing unit 13 stores the failure information in the storage unit 11 (step A106).

Then, the initialization unit 14 initializes the peripheral device (step A107).

As described above, the peripheral device 10 terminates the operation at the time when a failure related to the peripheral device occurs.

Figure 16:
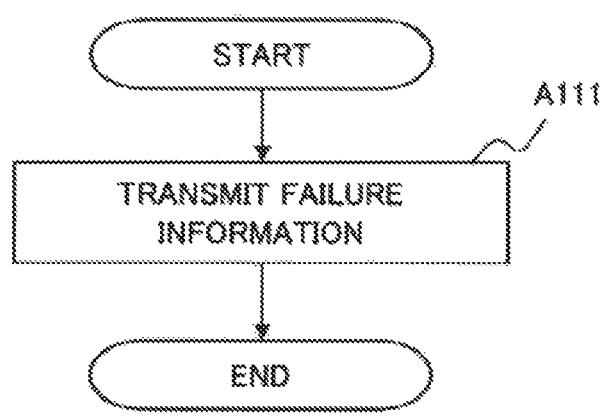
FIG. 16 is a flowchart illustrating an operation of the peripheral device, after initialization of the peripheral device, in the third example embodiment of the present invention.

Next, an operation, after the peripheral device 10 is initialized, is illustrated in FIG. 16.

Hereinto, the failure-information processing unit 13 reads, when receiving the request for failure information from the host device, the failure information from the storage unit 11 and transmits the failure information to the host device (step A111).

As described above, the peripheral device 10 terminates the operation after initialization.

Next, an advantageous effect of the third example embodiment of the present invention is described.

The peripheral device as the third example embodiment of the present invention is able to further reduce, when a failure related to the peripheral device occurs, a time necessary to recover from the failure while more reliably providing information relating to the failure to an outside.

The reason is described as follows. In the peripheral device of the present example embodiment, the failure detection unit detects a failure related to the peripheral device, and notifies a host device of occurrence of the failure. When there is a request for failure information from the host device as the notification destination, the failure-information processing unit transmits the failure information to the host device. Then, the initialization unit initializes the peripheral device depending on the instruction of the host device. Further, when there is no request for failure information from the host device as the notification destination after notifying the host device of the occurrence of the failure, the failure-information processing unit stores the failure information in the storage unit and initializes the peripheral device after storing the failure information. Then, when failure information is requested by the host device, the failure-information processing unit reads the failure information from the storage unit and transmits the failure information to the host device.

In this manner, the peripheral device of the present example embodiment more reliably provides, at the time when a failure related to the peripheral device occurs, failure information to an outside, and recovers the peripheral device by initialization, regardless of whether or not communication with a host device is possible.

Fourth Example Embodiment

Figure 17:
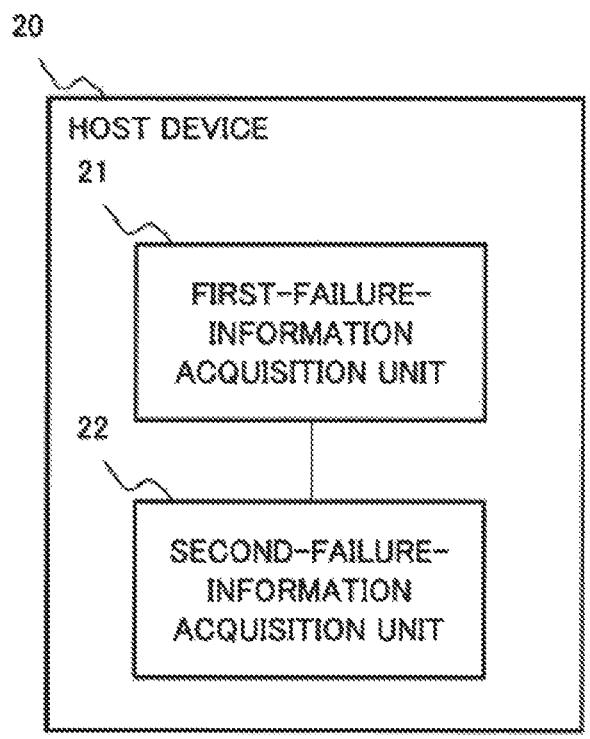
FIG. 17 is a block diagram illustrating a configuration of a host device as a fourth example embodiment of the present invention.

Next, a host device 20 having a minimum configuration of the example embodiment of the present invention is described with reference to the drawings. First, a function block configuration of the host device 20 is illustrated in FIG. 17. In FIG. 17, the host device 20 includes a first-failure-information acquisition unit 21 and a second-failure-information acquisition unit 22. Further, the host device 20 is connected to a peripheral device.

The first-failure-information acquisition unit 21 requests failure information to the peripheral device when occurrence of a failure is notified from the peripheral device. Further, the first-failure-information acquisition unit 21 instructs, after acquiring the failure information, initialization to the peripheral device.

The second-failure-information acquisition unit 22 requests failure information to the peripheral device when having not acquired failure information yet upon success in initialization of the peripheral device, and acquires the failure information.

An operation of the host device 20 configured as described above is described with reference to the drawings.

Figure 18:
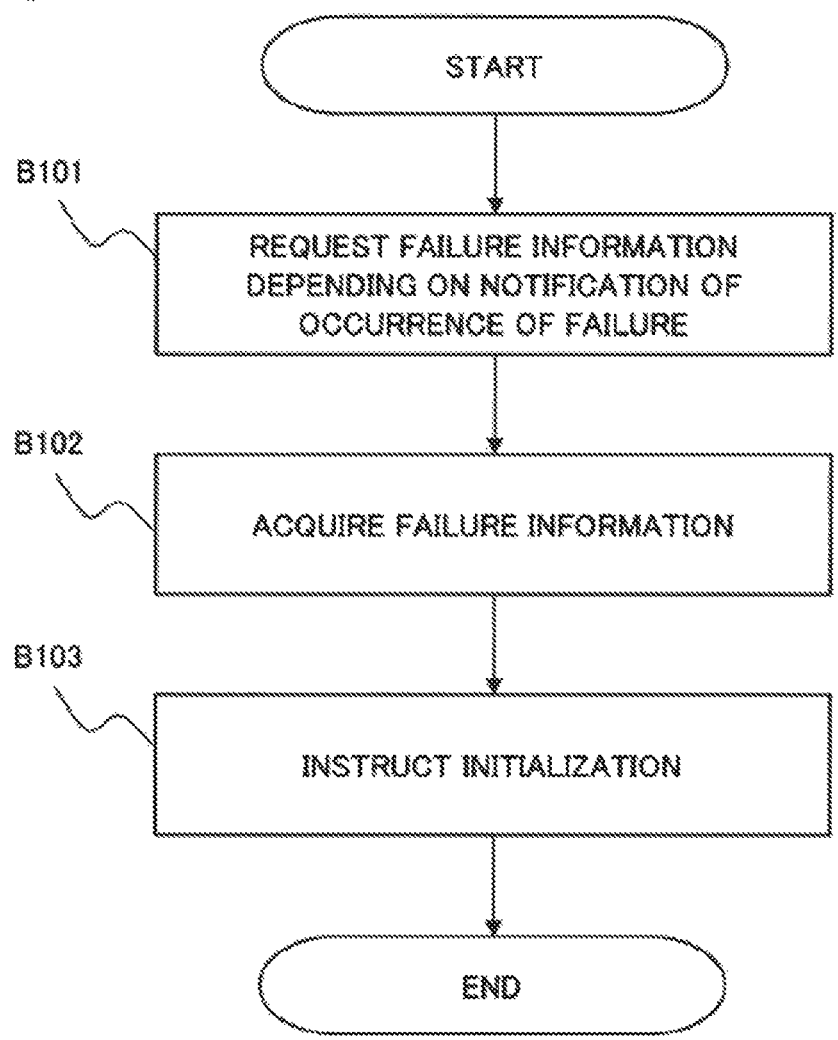
FIG. 18 is a flowchart illustrating an operation of the host device, at the time when occurrence of a failure is notified from a peripheral device, in the fourth example embodiment of the present invention.

First, an operation of the host device 20, at the time when, occurrence of a failure is notified from a peripheral device, is illustrated in FIG. 18.

First, the first-failure-information acquisition unit 21 requests, when receiving a notification of occurrence of a failure, failure information to the peripheral device (step B101).

Next, the first-failure-information acquisition unit 21 acquires failure information transmitted from the peripheral device (step B102).

Next, the first-failure-information acquisition unit 21 instructs initialization to the peripheral device (step B103).

As described above, the host device 20 terminates the operation in which occurrence of a failure is notified from the peripheral device.

Figure 19:
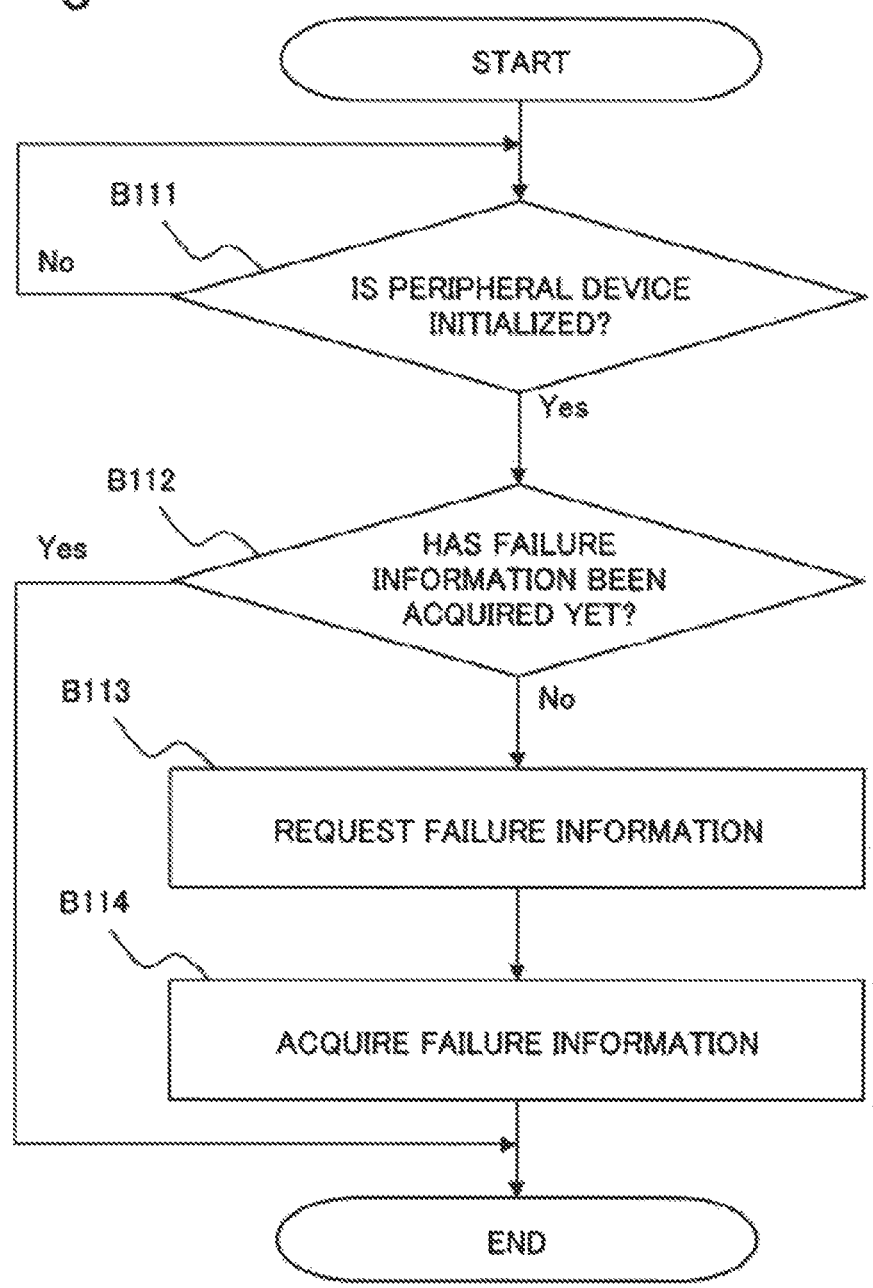
FIG. 19 is a flowchart illustrating an operation of the host device, at the time when a peripheral device is initialized in the fourth example embodiment of the present invention.

Next, an operation of the host device 20, at the time when a peripheral device is initialized, is illustrated in FIG. 19.

First, the second-failure-information acquisition unit 22 determines, when detecting that the peripheral device is initialized (Yes in step B111), whether or not failure information has already been acquired (step B112).

Herein, when failure information has already been acquired (Yes in step B112), the host device 20 terminates the operation.

On the other hand, when failure information has not been acquired yet (No in step B112), the second-failure-information acquisition unit 22 requests failure information to the peripheral device (step B113).

Next, the second-failure-information acquisition unit 22 acquires the failure information transmitted from the peripheral device (step B114).

As described above, the host device 20 terminates the operation in which the peripheral device has been initialized.

Next, an advantageous effect of the fourth example embodiment of the present invention is described.

The host device as the fourth example embodiment of the present invention is able to further reduce, when a failure related to a peripheral device occurs, a time necessary to recover from the failure while more reliably acquiring information relating to the failure.

The reason is described as follows. In the host device of the present example embodiment, the first-failure-information acquisition unit requests failure information to the peripheral device when occurrence of a failure is notified from the peripheral device. The first-failure-information acquisition unit instructs initialization to the peripheral device after acquiring the failure information. Further, the second-failure-information acquisition unit requests, when detecting initialization of the peripheral device, failure information to the peripheral device when having not acquired the failure yet, and acquires the failure information.

In this manner, the host device of the present example embodiment is able to acquire, when a failure related to a peripheral device occurs during operation of the peripheral device, failure information also while automatically recovering the peripheral device, regardless of whether or not communication with the peripheral device is possible.

Fifth Example Embodiment

Figure 20:
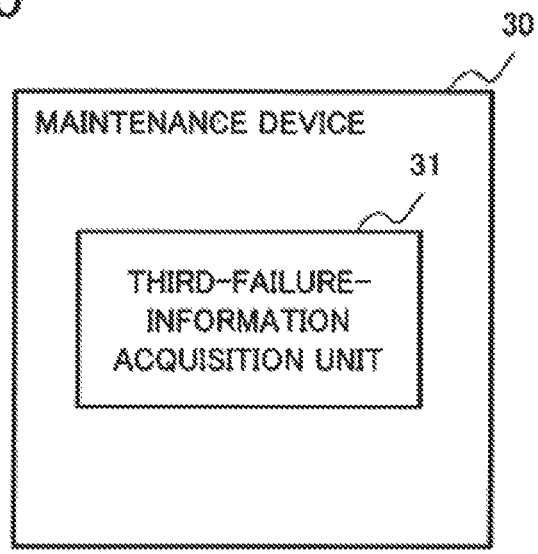
FIG. 20 is a block diagram illustrating a configuration of a maintenance device as a fifth example embodiment of the present invention.

Next, a maintenance device 30 having a minimum configuration of the example embodiment of the present invention is described in detail with reference to the drawings. First, a function block configuration of the maintenance device 30 is illustrated in FIG. 20. In FIG. 20, the maintenance device 30 includes a third-failure-information acquisition unit 31. Further, the maintenance device 30 can be connected to a storage unit of a peripheral device via a maintenance-device connection unit included in the peripheral device.

The third-failure-information acquisition unit 31 acquires failure information from the storage unit of the peripheral device via the maintenance-device connection unit.

An operation of the maintenance device 30 configured as described above is illustrated in FIG. 21.

Figure 21:
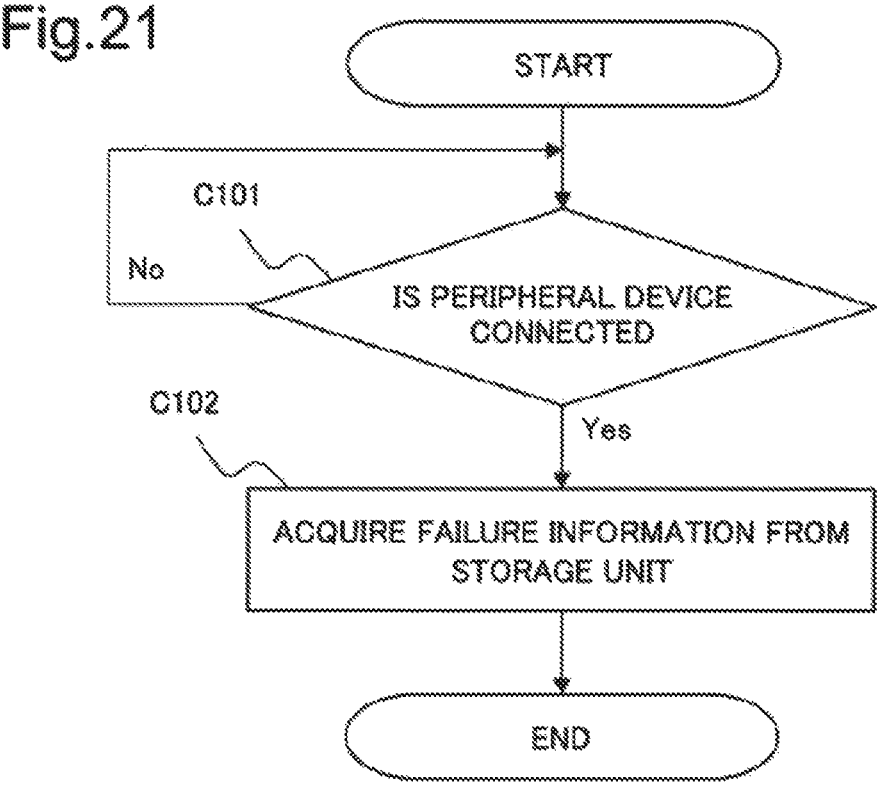
FIG. 21 is a flowchart illustrating an operation of the maintenance device, at the time when a peripheral device is connected, in the fifth example embodiment of the present invention.

In FIG. 21, first, the third-failure-information acquisition unit 31 acquires, when detecting that connection to the storage unit of the peripheral device is established via the maintenance-device connection unit (Yes in step C101), failure information from the storage unit of the peripheral device (step C102).

Note that the peripheral device is connected to the maintenance device 30, typically when failure related to the peripheral device occurs and initialization of the peripheral device fails. In such a case, the peripheral device is connected to, for example, the maintenance device 30 by being detached from the host device.

As described above, the maintenance device 30 terminates the operation.

Next, an advantageous effect of the fifth example embodiment of the present invention is described.

The maintenance device as the fifth example embodiment of the present invention is able to reliably acquire information relating to a failure from the peripheral device having failed in automatic recovery after occurrence of the failure.

The reason is described as follows. In the present example embodiment, the third-failure-information acquisition unit acquires, when being connected to the maintenance-device connection unit included in the peripheral device having failed in initialization, failure information from the storage unit of the peripheral device via the maintenance-device connection unit.

Note that, in the first example embodiment of the present invention described above, an example in which a peripheral device is a PCI device connected to a host device via a PCI bus is described. However, in the example embodiments of the present invention, a standard for connecting a peripheral device to a host device is not limited thereto.

Further, in the first example embodiment of the present invention described above, an example in which a peripheral device is a device mounted with a GPGPU is described. However, in the example embodiments of the present invention, a processor mounted on a peripheral device is not limited to a GPGPU. For example, a peripheral device may be a device mounted with a network controller, a sound controller, or the like.

Further, in the second and the fifth example embodiments of the present invention described above, an example in which a maintenance device is connected to a peripheral device where a failure occurs during operation and fails to recover automatically is described. Without limitation thereto, a maintenance device may be connected to a peripheral device in another state.

Further, in the third example embodiment of the present invention described above, an example in which a second-failure-information acquisition unit of a host device and a third-failure-information acquisition unit of a maintenance device determine whether or not failure information is not acquired based on a flag stored in a storage unit of a peripheral device together with failure information is described. Without imitation thereto, in the example embodiments of the present invention, a second and a third-failure-information acquisition unit may determine whether or not failure information is not acquired by using another piece of information. The second and the third-failure-information acquisition units may determine whether or not failure information is not acquired, for example, based on whether or not the failure information has been already stored in the peripheral device.

Further, in each of the example embodiments of the present invention described above, an example in which each function block is achieved by a processor that executes a computer program stored in a memory is mainly described. Without limitation thereto, a part or all of function blocks or a combination thereof may be achieved by using dedicated hardware.

Further, in the example embodiments of the present invention described above, an operation of each device described with reference to each flowchart is stored in a storage device (storage medium) of a computer device as a computer program of the present invention. Then, the computer program may be read and executed by a processor. In such a case, the present invention is configured to a code of the computer program or a storage medium.

Further, each of the example embodiments of the present invention described above can be carried out via an appropriate combination thereof.

Further, the present invention is not limited to the example embodiments described above and can be carried out in various forms.

The whole or part of the example embodiments disclosed above can be described as, but not limited to, the following supplementary notes.

(Supplementary Note 1)

A peripheral device includes:

a memory; and at least one processor coupled to the memory, the processor performing operations, the operations includes:

detecting a failure related to the peripheral device, and notifying a host device of occurrence of the failure;

transmitting, when failure information relating to the failure is requested by the host device after notifying of the occurrence of the failure, the failure information to the host device, storing the failure information in the memory when there is no request for the failure information from the host device, and reading the failure information from the memory and transmitting the read failure information to the host device when the stored failure information is requested by the host device; and initializing, when initialization is instructed by the host device, the peripheral device depending on the instruction and initializing, when the failure information is stored in the memory, the peripheral device after storing the failure information in the memory.

(Supplementary Note 2)

The peripheral device according to supplementary note 1, wherein the operations further includes connecting the memory to a maintenance device.

(Supplementary Note 3)

A host device includes:

a memory; and at least one processor coupled to the memory, the processor performing operations, the operations includes:

requesting, when the occurrence of the failure is notified from the peripheral device according to supplementary note 1 or 2, the failure information to the peripheral device, and instructing the initialization to the peripheral device after acquiring the failure information; and requesting, when detecting the initialization of the peripheral device, the failure information to the peripheral device when having not acquired the failure information yet, and acquiring the failure information.

(Supplementary Note 4)

A maintenance device includes:

a memory; and at least one processor coupled to the memory, the processor performing operations, the operations includes:

reading and acquiring, when being connected to the memory of the peripheral device according to supplementary note 2, the failure information from the memory.

(Supplementary Note 5)

An information processing system includes:

the peripheral device according to supplementary note 1 or 2; and the host device according to supplementary note 3.

(Supplementary Note 6)

An information processing system includes:

the peripheral device according to supplementary note 2;

the host device according to supplementary note 3; and the maintenance device according to supplementary note 4.

(Supplementary Note 7)

The peripheral device according to supplementary note 1 or 2, wherein the operations further includes storing, when storing the failure information in the memory, a flag indicating that the failure information is not acquired together.

(Supplementary Note 8)

The host device according to supplementary note 3, wherein the operations further includes executing, when determining that the failure information is not acquired based on the flag, processing of acquiring the failure information from the peripheral device according to supplementary note 7.

(Supplementary Note 9)

The maintenance device according to supplementary note 4, wherein the operations further includes executing, when determining that the failure information is not acquired based on the flag, processing of acquiring the failure information from the peripheral device according to supplementary note 7 dependent on supplementary note 2.

(Supplementary Note 10)

A method includes:

detecting, by a peripheral device, a failure related to the peripheral device, and notifying a host device of occurrence of the failure;

requesting, by the host device, failure information relating to the failure to the peripheral device depending on notification of the occurrence of the failure;

transmitting, by the peripheral device, the failure information to the host device depending on the request;

instructing, by the host device, initialization to the peripheral device after acquiring the failure information;

initializing, by the peripheral device, the peripheral device depending on the instruction for the initialization;

storing, by the peripheral device, the failure information in a memory when there is no request for the failure information from the host device after notifying of the occurrence of the failure to the host device, and initializing the peripheral device after storing the failure information in the memory;

requesting, by the host device, when detecting initialization of the peripheral device, the failure information to the peripheral device when having not acquired the failure information yet; and reading, by the peripheral device, the failure information from the memory depending on the request, and transmitting the failure information to the host device.

(Supplementary Note 11)

The method according to supplementary note 10, further includes:

when the peripheral device initializes the peripheral device after storing the failure information in the memory and fails in the initialization, reading and acquiring, by a maintenance device, when being connected to the memory included in the peripheral device, the failure information from the memory.

(Supplementary Note 12)

A method by a peripheral device includes:

detecting a failure related to the peripheral device, and notifying a host device of occurrence of the failure;

transmitting, when failure information relating to the failure is requested by the host device after notifying of the occurrence of the failure, the failure information to the host device;

initializing, when initialization is instructed by the host device, the peripheral device depending on the instruction;

storing, when there is no request for the failure information from the host device after notifying of the occurrence of the failure, the failure information in a memory and initializing the peripheral device after storing the failure information in the memory; and reading, when the stored failure information is requested by the host device, the failure information from the memory, and transmitting the failure information to the host device.

(Supplementary Note 13)

A non-transitory computer-readable recording medium embodying a program, the program causing a peripheral device to perform a method, the method includes:

detecting a failure related to the peripheral device, and notifying a host device of occurrence of the failure;

transmitting, when failure information relating to the failure is requested by the host device after notifying of the occurrence of the failure, the failure information to the host device;

initializing, when initialization is instructed by the host device, the peripheral device depending on the instruction;

storing, when there is no request for the failure information from the host device after notifying of the occurrence of the failure, the failure information in a memory, and initializing the peripheral device after storing the failure information in the memory; and reading, when the stored failure information is requested by the host device, the failure information from the memory and transmitting the failure information to the host device.

(Supplementary Note 14)

A non-transitory computer-readable recording medium embodying a program, the program causing a host device to perform a method, the method includes:

requesting, when occurrence of the failure is notified from a peripheral device that executes the program recorded on the recording medium according to supplementary note 13, the failure information to the peripheral device, and instructing initialization to the peripheral device after acquiring the failure information; and requesting and acquiring, when detecting initialization of the peripheral device, the failure information to the peripheral device when having not acquired the failure information yet.

(Supplementary Note 15)

A non-transitory computer-readable recording medium embodying a program, the program causing a maintenance device to perform a method, the method includes:

reading and acquiring, when being connected to the memory of a peripheral device that executes the program recorded on the recording medium according to supplementary note 13 included in the peripheral device, the failure information from the memory.

The present invention has been described by using the example embodiments described above as example examples. However, the present invention is not limited to the example embodiments described above. In other words, the present invention is applicable with various forms that can be understood by those of ordinary skill in the art, without departing from the scope of the present invention.

This application is based upon and claims the benefit of priority from Japanese patent application No. 2016-240864, filed on Dec. 13, 2016, the disclosure of which is incorporated herein in its entirety by reference.

REFERENCE SIGNS LIST 1, 2 Information processing system
10, 100, 120 Peripheral device
11, 101 Storage unit
12, 102 Failure detection unit
13, 103, 123 Failure-information processing unit
14, 104 Initialization unit
124 Maintenance-device connection unit
20, 200, 220 Host device
21, 201 First-failure-information acquisition unit
22, 202, 222 Second-failure-information acquisition unit
30, 320 Maintenance device
31, 321 Third-failure-information acquisition unit
90, 91, 92 Bus
1001 Processor
1002 Microcontroller
1003 Non-transitory memory
1004, 1005 Peripheral-device connection interface
1005 Peripheral-device connection interface
2001, 3001 CPU
2002, 3002 Memory
2004, 3005 Peripheral-device connection interface

What is claimed is:

1. A peripheral device comprising:
a memory; and
at least one processor coupled to the memory,
the at least one processor performing operations, the operations comprising:
detecting a failure related to the peripheral device, and notifying a host device of occurrence of the failure;
starting a timer after notifying the host device of the occurrence of the failure;
when receiving a request for failure information relating to the failure from the host device after notifying of the occurrence of the failure and before the timer expires, transmitting the failure information to the host device and initializing the peripheral device depending on an instruction for initialization from the host device; and
when not receiving the request from the host device after notifying of the occurrence of the failure and before the timer expires, storing the failure information in the memory, initializing the peripheral device after storing the failure information, and
when the initialization has succeeded, transmitting the failure information read out from the memory to the host device when receiving the request for the failure information from the host device after initializing the peripheral device, and
when the initialization has not succeeded, transmitting the failure information read out from the memory to a maintenance device when receiving the request for the failure information from the maintenance device after initializing the peripheral device.

2. The peripheral device according to claim 1,
wherein the operations further comprises
connecting the memory to the maintenance device.

3. The peripheral device according to claim 1, wherein the operations further comprises
storing, when storing the failure information in the memory, a flag indicating that the failure information is not acquired together.

4. A method performed by a peripheral device, the method comprising:
detecting a failure related to the peripheral device, and notifying a host device of occurrence of the failure;
starting a timer after notifying the host device of the occurrence of the failure;
when receiving a request for failure information relating to the failure from the host device after notifying of the occurrence of the failure and before the timer expires, transmitting the failure information to the host device and initializing the peripheral device depending on an instruction for initialization from the host device; and
when not receiving the request from the host device after notifying of the occurrence of the failure and before the timer expires, storing the failure information in a memory, initializing the peripheral device after storing the failure information, and
when the initialization has succeeded, transmitting the failure information read out from the memory to the host device when receiving the request for the failure information from the host device after initializing the peripheral device, and
when the initialization has not succeeded, transmitting the failure information read out from the memory to a maintenance device when receiving the request for the failure information from the maintenance device after initializing the peripheral device.

5. A non-transitory computer-readable recording medium storing a program, the program causing a peripheral device to perform a method, the method comprising:
detecting a failure related to the peripheral device, and notifying a host device of occurrence of the failure;
starting a timer after notifying the host device of the occurrence of the failure;
when receiving a request for failure information relating to the failure from the host device after notifying of the occurrence of the failure and before the timer expires, transmitting the failure information to the host device and initializing the peripheral device depending on an instruction for initialization from the host device; and
when not receiving the request from the host device after notifying of the occurrence of the failure and before the timer expires, storing the failure information in a memory, initializing the peripheral device after storing the failure information, and
when the initialization has succeeded, transmitting the failure information read out from the memory to the host device when receiving the request for the failure information from the host device after initializing the peripheral device, and
when the initialization has not succeeded, transmitting the failure information read out from the memory to a maintenance device when receiving the request for the failure information from the maintenance device after initializing the peripheral device.

* * * * *